US011413686B2

(12) United States Patent
Okoli et al.

(10) Patent No.: US 11,413,686 B2
(45) Date of Patent: Aug. 16, 2022

(54) METHODS AND APPARATUSES FOR SEALING MECHANISMS FOR REALIZING ADHESIVE CONNECTIONS WITH ADDITIVELY MANUFACTURED COMPONENTS

(71) Applicant: DIVERGENT TECHNOLOGIES, INC., Los Angeles, CA (US)

(72) Inventors: Chukwubuikem Marcel Okoli, Los Angeles, CA (US); Antonio Bernerd Martinez, Los Angeles, CA (US); Eahab Nagi El Naga, Los Angeles, CA (US); William David Kreig, Los Angeles, CA (US); David Brian TenHouten, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 16/812,116

(22) Filed: Mar. 6, 2020

(65) Prior Publication Data
US 2021/0276088 A1 Sep. 9, 2021

(51) Int. Cl.
*B33Y 80/00* (2015.01)
*B22F 10/00* (2021.01)
*B22F 10/10* (2021.01)

(52) U.S. Cl.
CPC .............. *B22F 10/00* (2021.01); *B33Y 80/00* (2014.12); *B22F 10/10* (2021.01)

(58) Field of Classification Search
CPC ... A61M 2039/0666; B65B 7/18; F16L 17/03; F16L 17/025; B33Y 80/00
See application file for complete search history.

(56) References Cited

U.S. PATENT DOCUMENTS

| 4,050,703 A * | 9/1977 | Tuvesson ............... F16L 17/025 277/615 |
| 4,188,040 A * | 2/1980 | Wolf ..................... F16L 17/025 277/625 |
| 5,203,226 A | 4/1993 | Hongou et al. |
| 5,742,385 A | 4/1998 | Champa |
| 5,990,444 A | 11/1999 | Costin |
| 6,010,155 A | 1/2000 | Rinehart |

(Continued)

FOREIGN PATENT DOCUMENTS

| WO | 1996036455 A1 | 11/1996 |
| WO | 1996036525 A1 | 11/1996 |

(Continued)

OTHER PUBLICATIONS

US 9,202,136 B2, 12/2015, Rhoads et al. (withdrawn)

(Continued)

*Primary Examiner* — Christopher T Schatz
(74) *Attorney, Agent, or Firm* — ArentFox Schiff LLP

(57) ABSTRACT

A node may be additively manufactured. The node may include a first surface and a second surface, and the second surface may bound a recess of the node. A structure may be inserted into the recess. A sealing member extend away from the second surface and contact the structure, such that a sealed space may be created between the node and the structure. An adhesive may be applied in the sealed space to at least partially attach the structure to the node.

12 Claims, 16 Drawing Sheets

(56) References Cited

U.S. PATENT DOCUMENTS

| | | | |
|---|---|---|---|
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Garni et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |
| 9,764,520 B2 | 9/2017 | Johnson et al. | |
| 9,765,226 B2 | 9/2017 | Dain | |
| 9,770,760 B2 | 9/2017 | Liu | |
| 9,773,393 B2 | 9/2017 | Velez | |
| 9,776,234 B2 | 10/2017 | Schaafhausen et al. | |
| 9,782,936 B2 | 10/2017 | Glunz et al. | |
| 9,783,324 B2 | 10/2017 | Embler et al. | |
| 9,783,977 B2 | 10/2017 | Alqasimi et al. | |
| 9,789,548 B2 | 10/2017 | Golshany et al. | |
| 9,789,922 B2 | 10/2017 | Dosenbach et al. | |
| 9,796,137 B2 | 10/2017 | Zhang et al. | |
| 9,802,108 B2 | 10/2017 | Aders | |
| 9,809,977 B2 | 11/2017 | Carney et al. | |
| 9,817,922 B2 | 11/2017 | Glunz et al. | |
| 9,818,071 B2 | 11/2017 | Jung et al. | |
| 9,821,339 B2 | 11/2017 | Paschkewitz et al. | |
| 9,821,411 B2 | 11/2017 | Buller et al. | |
| 9,823,143 B2 | 11/2017 | Twelves, Jr. et al. | |
| 9,829,564 B2 | 11/2017 | Bruder et al. | |
| 9,846,933 B2 | 12/2017 | Yuksel | |
| 9,854,828 B2 | 1/2018 | Langeland | |
| 9,858,604 B2 | 1/2018 | Apsley et al. | |
| 9,862,833 B2 | 1/2018 | Hasegawa et al. | |
| 9,862,834 B2 | 1/2018 | Hasegawa et al. | |
| 9,863,885 B2 | 1/2018 | Zaretski et al. | |
| 9,870,629 B2 | 1/2018 | Cardno et al. | |
| 9,879,981 B1 | 1/2018 | Dehghan Niri et al. | |

(56) References Cited

U.S. PATENT DOCUMENTS

| | | |
|---|---|---|
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | FenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |

(56) References Cited

U.S. PATENT DOCUMENTS

| | | |
|---|---|---|
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 10,493,883 B2 | 12/2019 | Mizobata et al. |
| 2004/0218990 A1* | 11/2004 | Stevenson ............... F16B 3/005 411/82 |
| 2006/0108783 A1 | 5/2006 | Ni et al. |
| 2014/0277669 A1 | 9/2014 | Nardi et al. |
| 2015/0016712 A1 | 1/2015 | Rhoads et al. |
| 2016/0325796 A1 | 11/2016 | Czinger et al. |
| 2017/0113344 A1 | 4/2017 | Schönberg |
| 2017/0341309 A1 | 11/2017 | Piepenbrock et al. |
| 2017/0341553 A1 | 11/2017 | Mizobata et al. |
| 2018/0051811 A1 | 2/2018 | White |
| 2019/0061835 A1 | 2/2019 | TenHouten et al. |
| 2019/0063476 A1 | 2/2019 | Barham et al. |
| 2019/0264843 A1* | 8/2019 | Furcoiu ................. F16L 17/032 |
| 2019/0322040 A1 | 10/2019 | Martinez, Jr. et al. |
| 2019/0344299 A1 | 11/2019 | TenHouten et al. |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Czinger et al. (withdrawn)
US 10,449,880 B2, 10/2019, Mizobata et al. (withdrawn)
Invitation to pay additional fees for PCT/US2021/020483, dated Apr. 20, 2021, 2 pages.
International Search Report and the Written Opinion Issued for Int'l Appl. No. PCT/US2021/020483, dated Jul. 7, 2021, 19 pages.

* cited by examiner

METHODS AND APPARATUSES FOR SEALING MECHANISMS FOR REALIZING ADHESIVE CONNECTIONS WITH ADDITIVELY MANUFACTURED COMPONENTS

BACKGROUND

Field

The present disclosure relates to transport structures such as automobiles, trucks, trains, boats, aircraft, motorcycles, metro systems, and the like, and more specifically to techniques for sealing mechanisms between various components.

Background

A transport structure such as an automobile, truck or aircraft employs a large number of interior and exterior panels. These panels provide structure to the automobile, truck and aircraft, and respond appropriately to the many different types of forces that are generated or that result from various actions like accelerating and braking. These panels also provide support. They provide floors for positioning seats and supports for securing large and heavy components. Panels participate in providing crucial suspension characteristics for an automobile. Uniquely-shaped panels provide special aerodynamic characteristics to both high-performance automobiles and aircraft. Interior door panels and dashboard panels may provide important functions and protect the occupant during an impact event. Panels are an integral part of transport structures.

Most panels must be coupled to, or interface securely with, other panels or other structures in secure, well-designed ways. These connection types may be accomplished using specialized joint members or nodes. These joint members or nodes serve not only to attach to, interface with, and secure the panel itself, but they also may be used to couple the panel to other critical components of the automobile (e.g., another panel, an extrusion, tubes, other nodes, etc.) or to perform independent functions. Transport structures commonly use various types of node-panel joints to enable panels to interface with other structures and to accomplish the above functions.

The design and manufacture of these node-panel joint structures has been problematic in part because the joints are often specialized structures requiring intricate sub-substructures for realizing secure, durable and long-lasting bonds with a panel. It is often extremely difficult to manufacture these types of complex structures efficiently or cheaply using traditional manufacturing processes. Machining, for example, may produce high-precision parts incorporating this level of detail, but at a significant cost. Casting and other methods may not produce the same levels of precision needed for such paneling applications. In addition, conventional joints used to connect panels are often unnecessarily bulkier and made out of heavier materials than necessary in view of the manufacturing limitations above. Needless to say, bulkier and heavier structures in vehicles produce geometrical design limitations and are inefficient. Moreover, where dissimilar materials are to be connected or otherwise used together, as is often the case in various structural applications, effective connection techniques using conventional manufacturing processes are complex and often difficult to achieve. The resulting connected components may be subject to corrosion and other problems over time.

In short, more efficient, lighter-weight, node designs with greater sophistication and superior capabilities are needed for interfacing with panels to implement potentially high performance applications at manageable price points.

SUMMARY

Additively manufacturing one or more nodes may allow inclusion of features for acceptance of sealants and/or adhesives. Therefore, there exists a need to develop sealing solutions in which additively manufactured components are connected to other components using adhesives. Sealing mechanisms for realizing adhesive connections with additively manufactured components and the manufacture thereof will be described more fully hereinafter with reference to various illustrative aspects of the present disclosure. For example, the present disclosure may provide one or more approaches for sealing one or more connection types (e.g., node and extrusion, node and panel, node and tube, and the like).

Prior to connecting additively manufactured nodes to two or more components using an adhesive, a seal may be implemented between the two or more components that are to be connected. Such a seal may provide for isolation between the two or more components being connected. For example, a sealant may prevent two or more components that are to be connected from physically contacting one another. This prevention of physical contact may be beneficial when the two or more components are composed of dissimilar materials (e.g., when an aluminum additively manufactured node is to be connected with a carbon fiber reinforced polymer composite tube). The isolation between the two or more components may be manipulated such that the spacing between the two or more components is of a satisfactory or desirable amount in order to obtain a satisfactory or desirable thickness for an adhesive bond.

In addition, a seal between two or more components that are to be connected may hermetically seal an enclosure for adhesive injection. That is, a sealant may provide an evacuated and hermetically sealed enclosure for adhesive injection when a vacuum is drawn. For example, by first evacuating a channel by connecting a negative pressure source (e.g., drawing a vacuum), a hermetically sealed adhesive path may be obtained. Once the path is evacuated (e.g., completely evacuated), an adhesive may be injected, and the sealant may ensure that the adhesive is drawn into the adhesive path.

In addition, a seal between two or more components that are to be connected may provide a hermetically sealed enclosure for a cured adhesive during operation of the component. Once an adhesive is cured and a bond is realized, a sealant may prevent exposure of the adhesive bond to the environment. In preventing exposure of the adhesive bond to the environment, the sealant may reduce contamination and/or degradation of the adhesive bond by foreign particles and/or chemicals.

In one embodiment, an apparatus may include an additively manufactured node including a first surface, a second surface, and a channel from the first surface to the second surface, wherein the channel is configured to carry an injected substance from the first surface to the second surface; and a seal member configured to extend away from the second surface in response to a pressure applied by the injected substance. In one embodiment, the seal member includes a bladder configured to receive the injected substance, such that the bladder expands in response to the pressure applied by the injected substance. In one embodiment, the second surface bounds a concavity in the node, and the bladder is arranged in the concavity. In one embodiment, the second surface bounds a concavity in the node, and the seal member includes a seal material arranged in the concavity, such that the seal material extends outward from the concavity in response to the pressure applied by the injected substance. In one embodiment, the seal member includes a first flap connected to the second surface, such that the first flap shifts away from the second surface in response to the pressure applied by the injected substance. In one embodiment, the first flap is co-printed with the node. In one embodiment, the seal member further includes a second flap connected to the second surface, the second flap being arranged opposing the first flap with a distal end of the second flap overlapping a distal end of the first flap, such that the second flap shifts away from the second surface in response to the pressure applied by the injected substance. In one embodiment, the first flap includes an outer surface that faces away from the second surface, and the seal member further includes a sealant bead arranged on the outer surface of the flap. In one embodiment, seal member includes an elastomeric material configured to deform in response to the pressure applied by the injected substance, such that the deformed elastomeric material extends away from the second surface. In one embodiment, the second surface bounds a recess in the node, and the apparatus further includes: the injected substance; and a structure inserted in the recess, such that the second surface surrounds a portion of the structure, the seal member may be arranged between the second surface and the portion of the structure, such that the seal member provides a seal between the second surface and the portion of the structure. In one embodiment, the structure includes one or more tubes. In one embodiment, the seal creates an enclosed, sealed space between the node and the portion of the structure, the apparatus further includes an adhesive applied in the space, the adhesive adhering the second surface to the portion of the structure. In one embodiment, the seal member includes a flap that is co-printed with the node to connect to the second surface, such that the flap deflects toward the second surface in response to pressure applied by the structure inserted into the recess, the flap including an outer surface that faces away from the second surface, the seal member further including a sealant bead arranged on the outer surface of the flap, and the injected substance includes an adhesive that adheres the second surface to the portion of the structure.

In one embodiment of the present disclosure, an apparatus may include: an additively manufactured node including a surface; and an elastomeric member attached to the surface; and an expandable substance arranged between the surface and the elastomeric member, wherein the elastomeric member is configured to deform in response to a pressure applied by the substance when the substance is expanded, such that the deformed elastomeric material extends away from the surface. In one embodiment, the substance includes a substance that expands in response to thermal activation.

In one embodiment of the present disclosure, a method of forming a seal between an additively manufactured node and a structure is provided. The node may include a recess and a channel to a sealing member in the recess. The method may include inserting the structure into the recess; and injecting a substance into the channel, such that the sealing member extends from a surface of the recess to a surface of the structure to create an enclosed, sealed space between the node and the structure. In one embodiment, the injected substance includes compressed air. In one embodiment, the injected substance includes a curable material. The method may further include creating a vacuum in the space. The method may further include applying an adhesive into the space.

In one embodiment of the present disclosure, a method of forming a seal between an additively manufactured node and a structure is provided. The node may include a surface bounding a recess. The method may include attaching an elastomeric material to the surface; depositing an expandable substance, such that the substance is arranged between the surface and the elastomeric material; inserting the structure into the recess; and expanding the substance, wherein the elastomeric material deforms in response to a pressure applied by the substance when the substance is expanded, such that the deformed elastomeric material extends away from the surface and contacts the structure. In one embodiment, the substance includes a thermally activated expanding substance.

It will be understood that other aspects of mechanisms for realizing adhesive connections with additively manufactured components and the manufacture thereof will become readily apparent to those skilled in the art from the following detailed description, wherein it is shown and described only several embodiments by way of illustration. As will be realized by those skilled in the art, the disclosed subject matter is capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of sealing mechanisms for realizing adhesive connections with additively manufactured components and the manufacture thereof will now be presented in the detailed description by way of example, and not by way of limitation, in the accompanying drawings, wherein.

DETAILED DESCRIPTION

Figure 1:
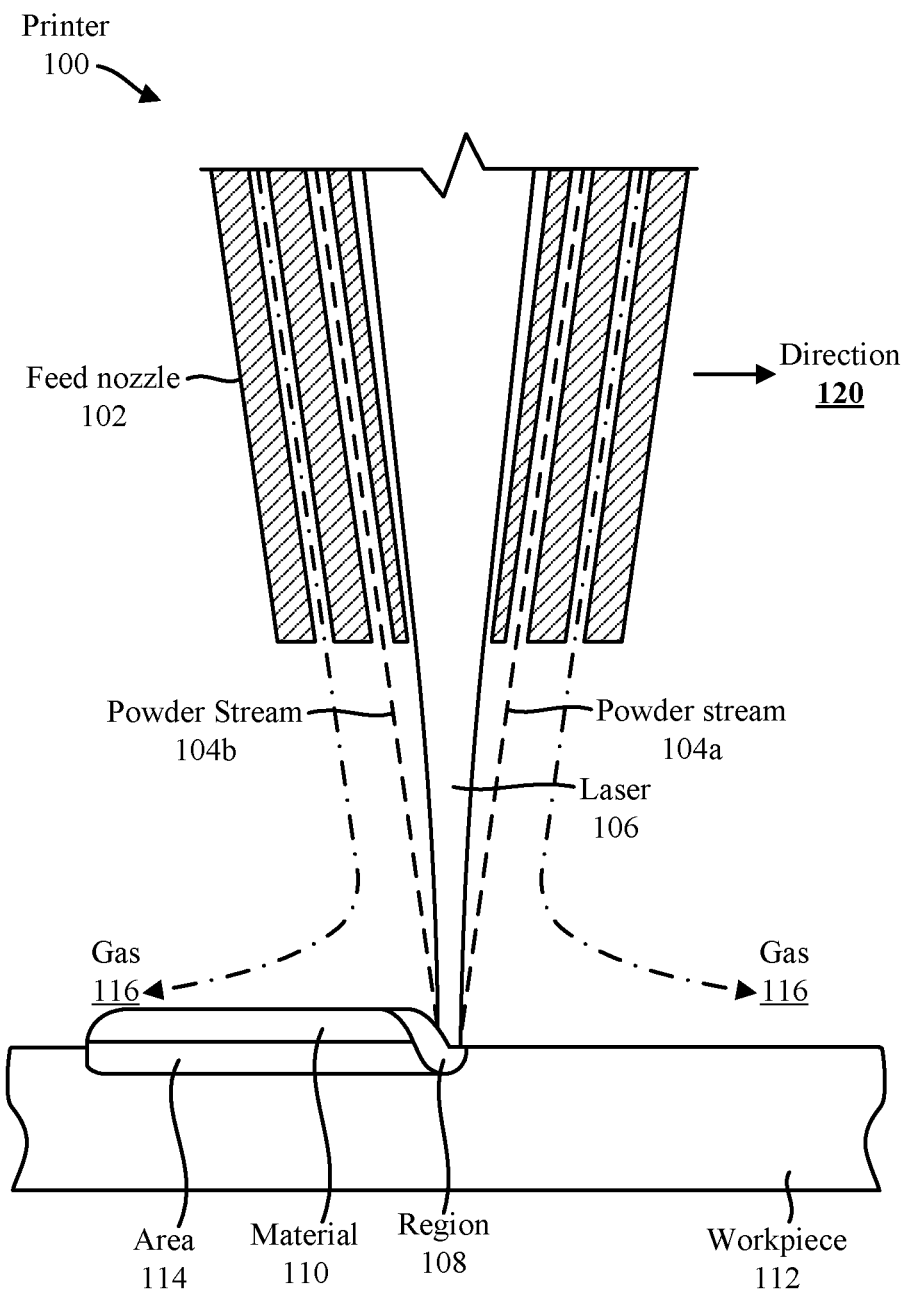
FIG. 1 illustrates an exemplary embodiment of certain aspects of a Direct Metal Deposition (DMD) 3-D printer.

The detailed description set forth below in connection with the appended drawings is intended to provide a description of various exemplary embodiments and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure. In addition, the figures may not be drawn to scale and instead may be drawn in a way that attempts to most effectively highlight various features relevant to the subject matter described.

This disclosure is generally directed to sealing mechanisms for realizing adhesive connections between components, e.g., for use in vehicles and other transport structures. In many cases, the nodes, panels, and other structures described in this disclosure may be formed using additive manufacturing (AM) techniques, due in part to AM's innumerable advantages (some of which may be articulated below). Accordingly, certain exemplary AM techniques that may be relevant to the formation of the nodes or structures described herein will initially be discussed. It should be understood, however, that numerous alternative manufacturing techniques, both additive and conventional, may instead be used in implementing sealing mechanisms for realizing adhesive connections between components (in part or in whole) disclosed herein, and that the identified sealing mechanisms for realizing adhesive connections between components need not be limited to the specific AM techniques below.

Manufacturers that stand to benefit from sealing mechanisms for realizing adhesive connections between components in this disclosure include those that manufacture virtually any mechanized form of transport, which often rely heavily on complex and labor intensive machine tools and molding techniques, and whose products often require the development of complex panels, nodes, structures, extrusions, and/or interconnects to be integrated with intricate machinery such as combustion engines, transmissions and increasingly sophisticated electronics. Examples of such transport structures include, among others, trucks, trains, tractors, boats, aircraft, motorcycles, busses, and the like.

Additive Manufacturing (3-D Printing). Additive manufacturing (AM) is advantageously a non-design specific manufacturing technique. AM provides the ability to create complex structures within a part. For example, nodes can be produced using AM. A node is a structural member that may include one or more interfaces used to connect to other spanning components such as tubes, extrusions, panels, other nodes, and the like. Using AM, a node may be constructed to include additional features and functions, depending on the objectives. For example, a node may be printed with one or more ports that enable the node to secure two parts by injecting an adhesive rather than welding multiple parts together, as is traditionally done in manufacturing complex products. Alternatively, some components may be connected using a brazing slurry, a thermoplastic, a thermoset, or another connection feature, any of which can be used interchangeably in place of an adhesive. Thus, while welding techniques may be suitable with respect to certain embodiments, additive manufacturing provides significant flexibility in enabling the use of alternative or additional connection techniques.

A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) combines two powder spreaders and a single print unit to spread metal powder and to print a structure in a single pass with apparently no wasted motion. As another illustration, electron beam additive manufacturing processes use an electron beam to deposit metal via wire feedstock or sintering on a powder bed in a vacuum chamber. Single Pass Jetting is another exemplary technology claimed by its developers to be much quicker than conventional laser-based systems. Atomic Diffusion Additive Manufacturing (ADAM) is still another recently developed technology in which components are printed, layer-by-layer, using a metal powder in a plastic binder. After printing, plastic binders are removed and the entire part is sintered at once into a desired metal.

One of several such AM techniques, as noted, is DMD. FIG. 1 illustrates an exemplary embodiment of certain aspects of a DMD 3-D printer 100. DMD printer 100 uses feed nozzle 102 moving in a predefined direction 120 to propel powder streams 104a and 104b into a laser beam 106, which is directed toward a workpiece 112 that may be supported by a substrate. Feed nozzle may also include mechanisms for streaming a shield gas 116 to protect the welded area from oxygen, water vapor, or other components.

The powdered metal is then fused by the laser 106 in a melt pool region 108, which may then bond to the workpiece 112 as a region of deposited material 110. The dilution area 114 may include a region of the workpiece where the deposited powder is integrated with the local material of the workpiece. The feed nozzle 102 may be supported by a computer numerical controlled (CNC) robot or a gantry, or other computer-controlled mechanism. The feed nozzle 102 may be moved under computer control multiple times along a predetermined direction of the substrate until an initial layer of the deposited material 110 is formed over a desired area of the workpiece 112. The feed nozzle 102 can then scan the region immediately above the prior layer to deposit successive layers until the desired structure is formed. In general, the feed nozzle 102 may be configured to move with respect to all three axes, and in some instances to rotate on its own axis by a predetermined amount.

Figure 2:
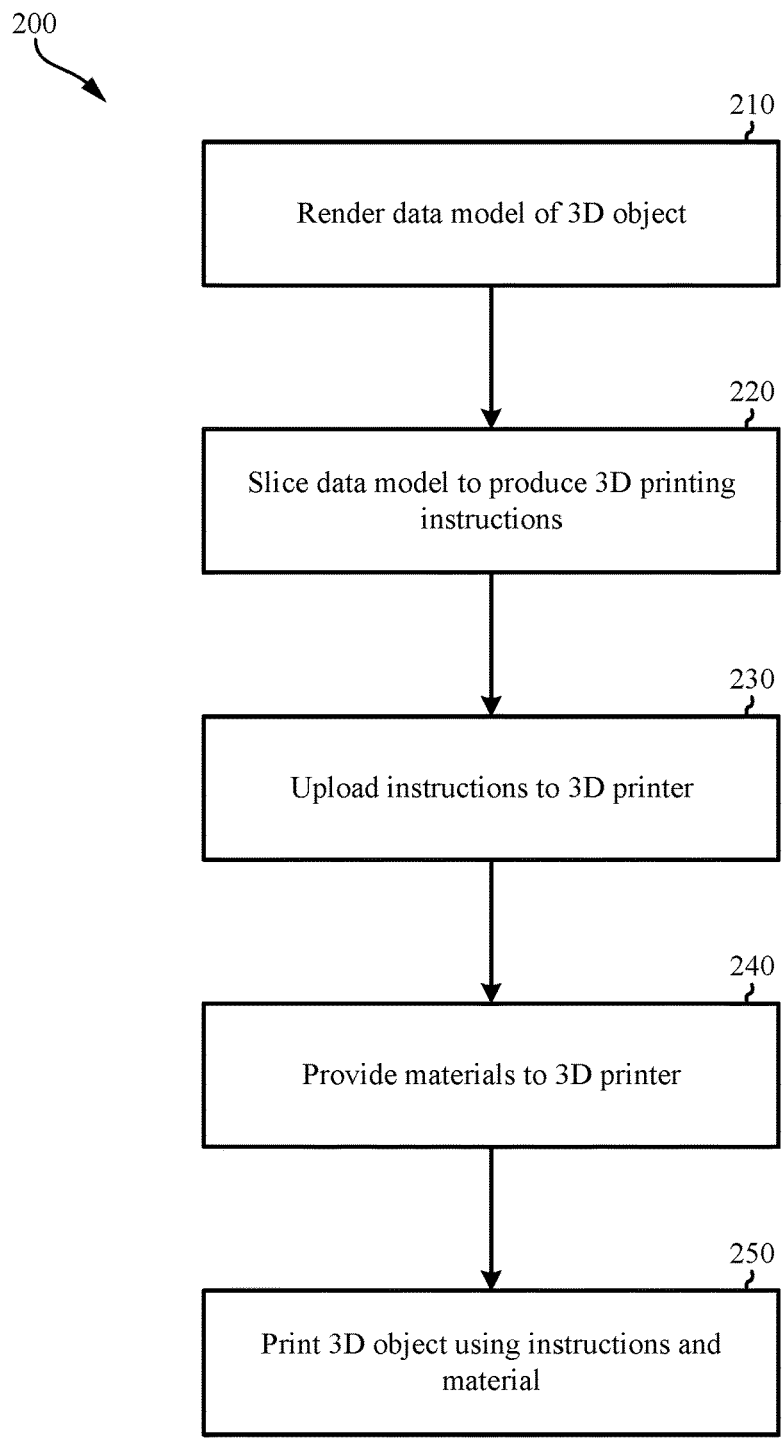
FIG. 2 illustrates a conceptual flow diagram of a 3-D printing process using a 3-D printer.

FIG. 2 is a flow diagram 200 illustrating an exemplary process of 3-D printing. A data model of the desired 3-D object to be printed is rendered (operation 210). A data model is a virtual design of the 3-D object. Thus, the data model may reflect the geometrical and structural features of the 3-D object, as well as its material composition. The data model may be created using a variety of methods, including CAE-based optimization, 3D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL is one example of a file format associated with commercially available stereolithography-based CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (operation 220). Numerous slicer programs are commercially available. Generally, the slicer program converts the data model into a series of individual layers representing thin slices (e.g., 100 microns thick) of the object be printed, along with a file containing the printer-specific instructions for 3-D printing these successive individual layers to produce an actual 3-D printed representation of the data model.

The layers associated with 3-D printers and related print instructions need not be planar or identical in thickness. For example, in some embodiments depending on factors like the technical sophistication of the 3-D printing equipment and the specific manufacturing objectives, etc., the layers in a 3-D printed structure may be non-planar and/or may vary in one or more instances with respect to their individual thicknesses.

A common type of file used for slicing data models into layers is a G-code file, which is a numerical control programming language that includes instructions for 3-D printing the object. The G-code file, or other file constituting the instructions, is uploaded to the 3-D printer (operation 230). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (operation 240). In DMD techniques, for example, one or more metal powders may be selected for layering structures with such metals or metal alloys. In selective laser melting (SLM), selective laser sintering (SLS), and other PBF-based AM methods (see below), the materials may be loaded as powders into chambers that feed the powders to a build platform. Depending on the 3-D printer, other techniques for loading printing materials may be used.

The respective data slices of the 3-D object are then printed based on the provided instructions using the material(s) (operation 250). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator. In fused deposition modelling, as described above, parts are printed by applying successive layers of model and support materials to a substrate. In general, any suitable 3-D printing technology may be employed for purposes of this disclosure.

Another AM technique includes powder-bed fusion ("PBF"). Like DMD, PBF creates 'build pieces' layer-by-layer. Each layer or 'slice' is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

FIGS. 3A-D illustrate respective side views of an exemplary PBF system 300 during different stages of operation. As noted above, the particular embodiment illustrated in FIGS. 3A-D is one of many suitable examples of a PBF system employing principles of this disclosure. It should also be noted that elements of FIGS. 3A-D and the other figures in this disclosure are not necessarily drawn to scale, but may be drawn larger or smaller for the purpose of better illustration of concepts described herein. PBF system 300 can include a depositor 301 that can deposit each layer of metal powder, an energy beam source 303 that can generate an energy beam, a deflector 305 that can apply the energy beam to fuse the powder, and a build plate 307 that can support one or more build pieces, such as a build piece 309. PBF system 300 can also include a build floor 311 positioned within a powder bed receptacle. The walls of the powder bed receptacle 312 generally define the boundaries of the powder bed receptacle, which is sandwiched between the walls 312 from the side and abuts a portion of the build floor 311 below. Build floor 311 can progressively lower build plate 307 so that depositor 301 can deposit a next layer. The entire mechanism may reside in a chamber 313 that can enclose the other components, thereby protecting the equipment, enabling atmospheric and temperature regulation and mitigating contamination risks. Depositor 301 can include a hopper 315 that contains a powder 317, such as a metal powder, and a leveler 319 that can level the top of each layer of deposited powder.

Figure 3A:
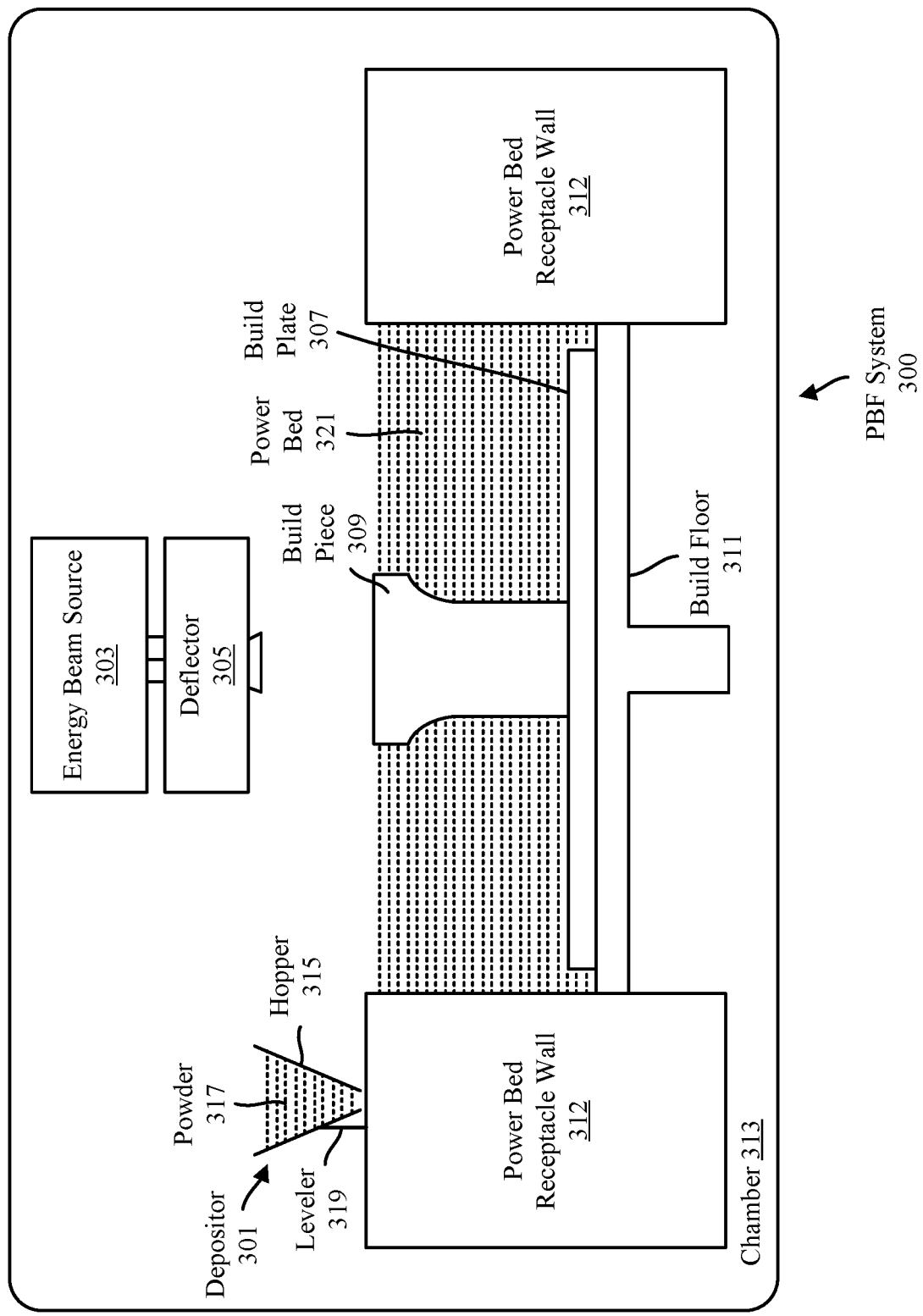
FIGS. 3A-D illustrate exemplary powder bed fusion (PBF) systems during different stages of operation.

Referring specifically to FIG. 3A, this figure shows PBF system 300 after a slice of build piece 309 has been fused, but before the next layer of powder has been deposited. In fact, FIG. 3A illustrates a time at which PBF system 300 has already deposited and fused slices in multiple layers, e.g., 150 layers, to form the current state of build piece 309, e.g., formed of 150 slices. The multiple layers already deposited have created a powder bed 321, which includes powder that was deposited but not fused.

Figure 3B:
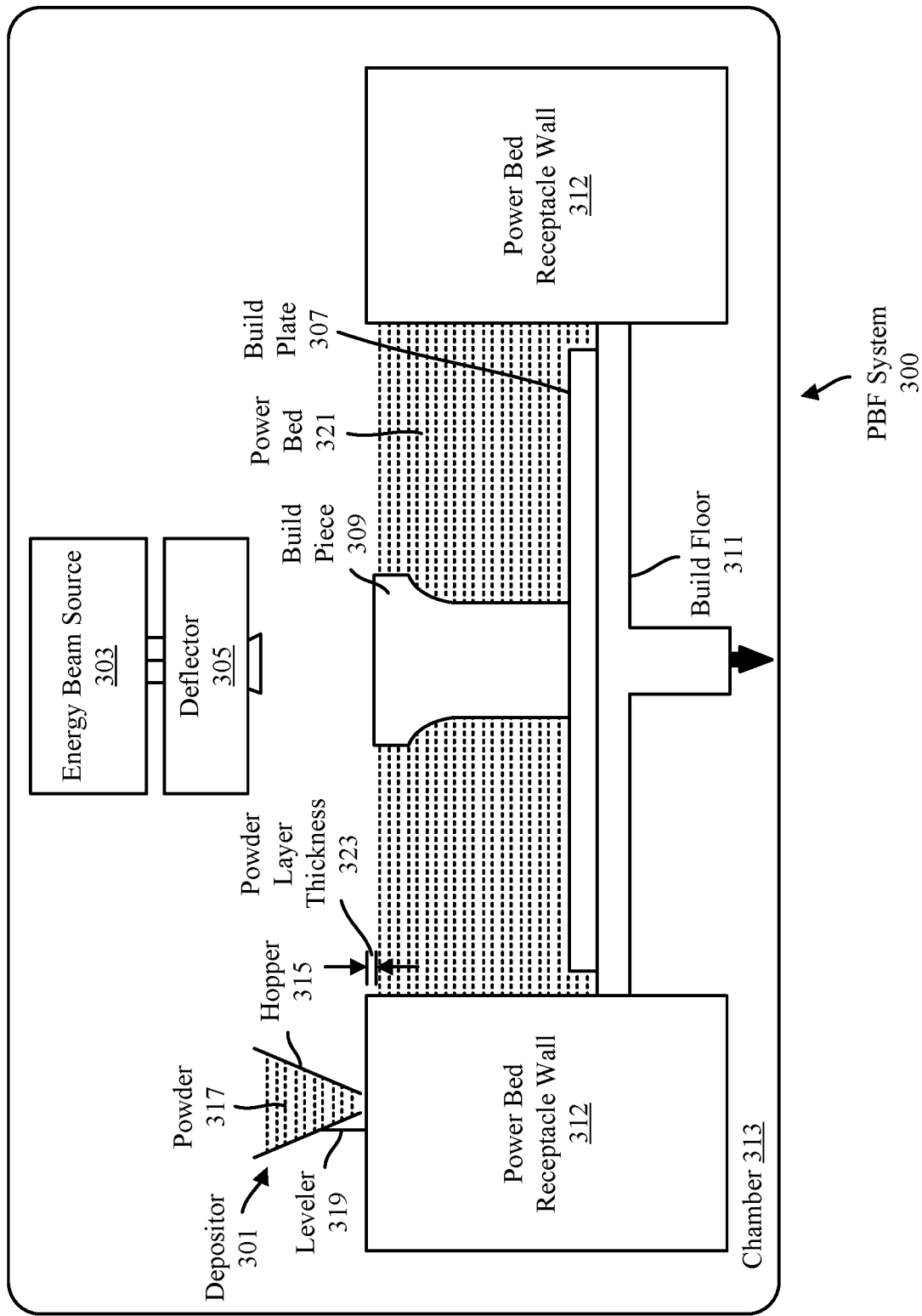

FIG. 3B shows PBF system 300 at a stage in which build floor 311 can lower by a powder layer thickness 323. The lowering of build floor 311 causes build piece 309 and powder bed 321 to drop by powder layer thickness 323, so that the top of the build piece and powder bed are lower than the top of powder bed receptacle wall 312 by an amount equal to the powder layer thickness. In this way, for example, a space with a consistent thickness equal to powder layer thickness 323 can be created over the tops of build piece 309 and powder bed 321.

Figure 3C:
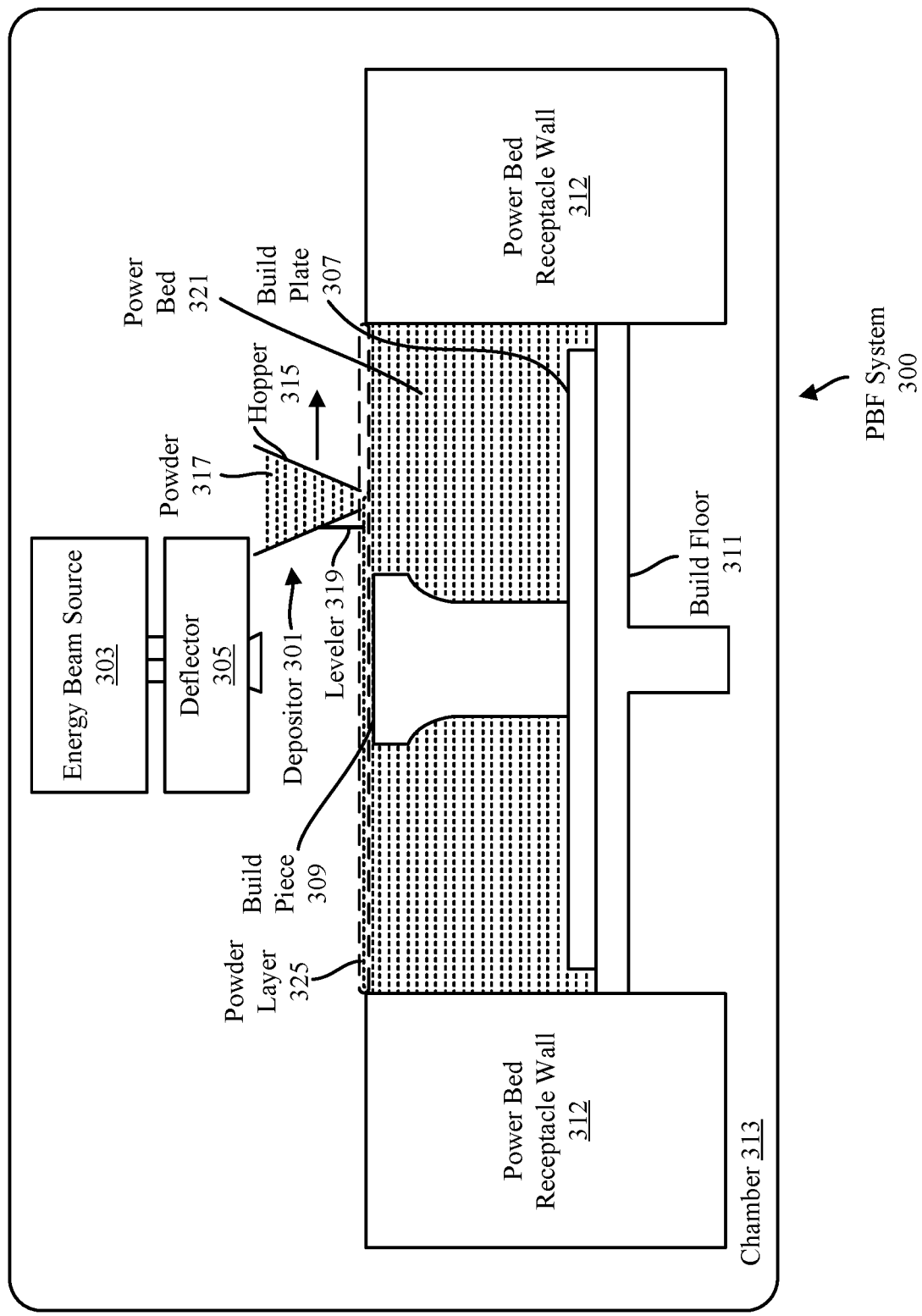

FIG. 3C shows PBF system 300 at a stage in which depositor 301 is positioned to deposit powder 317 in a space created over the top surfaces of build piece 309 and powder bed 321 and bounded by powder bed receptacle walls 312. In this example, depositor 301 progressively moves over the defined space while releasing powder 317 from hopper 315. Leveler 319 can level the released powder to form a powder layer 325 that has a thickness substantially equal to the powder layer thickness 323 (see FIG. 3B). Thus, the powder in a PBF system can be supported by a powder support structure, which can include, for example, a build plate 307, a build floor 311, a build piece 309, walls 312, and the like. It should be noted that the illustrated thickness of powder layer 325 (i.e., powder layer thickness 323 (FIG. 3B)) is greater than an actual thickness used for the example involving 350 previously-deposited layers discussed above with reference to FIG. 3A.

Figure 3D:
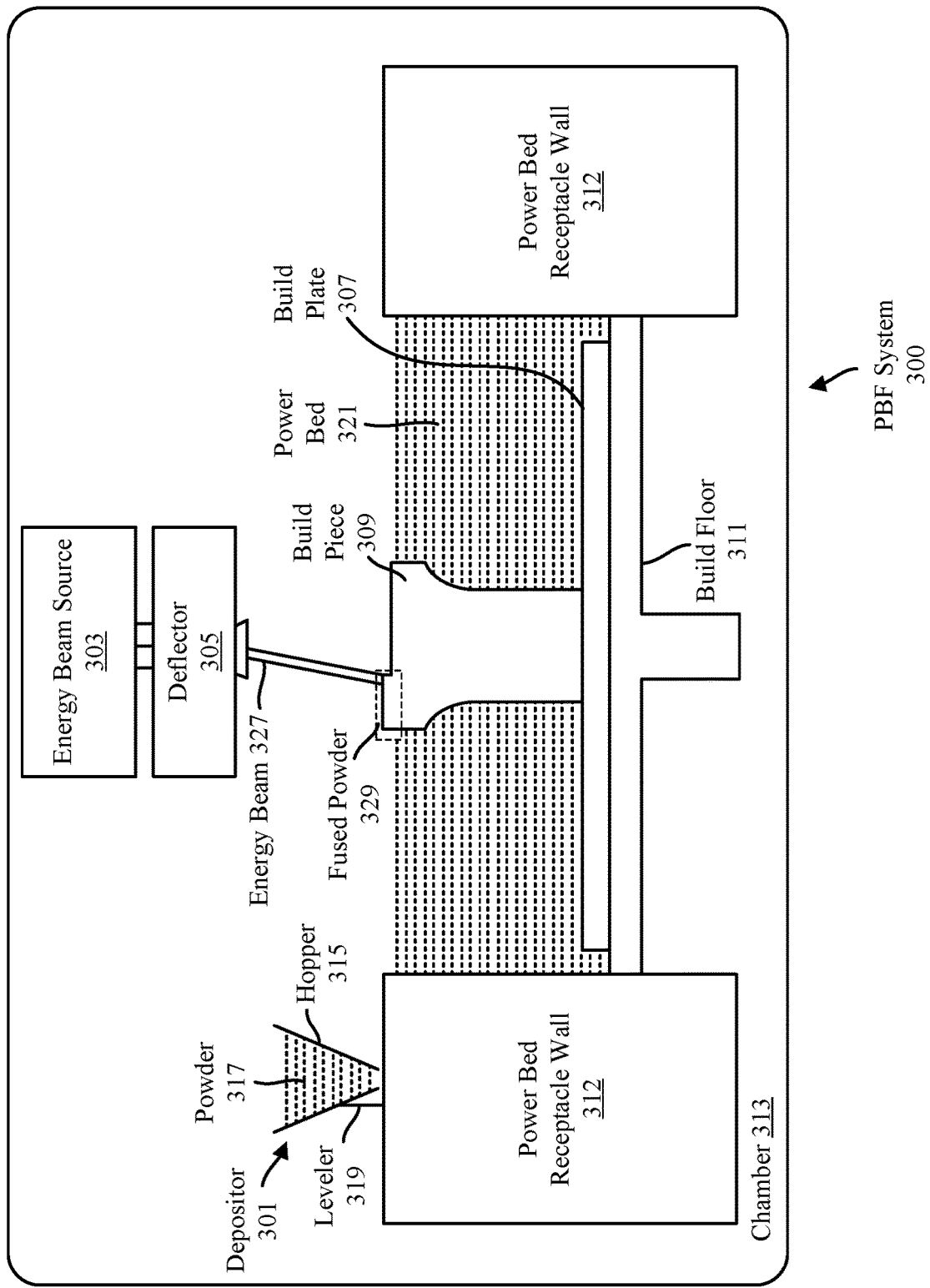

FIG. 3D shows PBF system 300 at a stage in which, following the deposition of powder layer 325 (FIG. 3C), energy beam source 303 generates an energy beam 327 and deflector 305 applies the energy beam to fuse the next slice in build piece 309. In various exemplary embodiments, energy beam source 303 can be an electron beam source, in which case energy beam 327 constitutes an electron beam. Deflector 305 can include deflection plates that can generate an electric field or a magnetic field that selectively deflects the electron beam to cause the electron beam to scan across areas designated to be fused. In various embodiments, energy beam source 303 can be a laser, in which case energy beam 327 is a laser beam. Deflector 305 can include an optical system that uses reflection and/or refraction to manipulate the laser beam to scan selected areas to be fused.

In various embodiments, the deflector 305 can include one or more gimbals and actuators that can rotate and/or translate the energy beam source to position the energy beam. In various embodiments, energy beam source 303 and/or deflector 305 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

This disclosure presents a technique for enabling sealing mechanisms for realizing adhesive connections between components, such as node-structure connections, node-structure joints, and node-structure interfaces. In an embodiment, at least one node-structure connection may be a part of a vehicle chassis. This type of node-structure connection may incorporate adhesive bonding between the node and the structure to realize the connection. Sealants may be used to provide adhesive regions for adhesive injection. In an exemplary embodiment, a seal may act as an isolator to inhibit potential galvanic corrosion caused, e.g., by the chronic contact between dissimilar materials.

A sealant region may include features such as a groove, dovetail groove, inset or other feature built into a surface of the node. The sealant region may accept a sealant such as an O-Ring or gasket, and effectively define a border or perimeter of each adhesive region. The sealant region with the accepted sealant may ensure that the adhesive region around which the sealant borders is hermetically sealed such that contamination of the adhesive region by foreign or environmental agents is prevented. Further, the sealant region and/or adhesive region, discussed below, may be used as an isolator to prevent direct contact between the panel and node. Where, for example, the panel and node are composed of dissimilar metals, this isolation may be crucial to enable reliable, long-lasting node-structure connections.

The sealant region may be additively manufactured with the node itself. In an embodiment, these features include concavities (e.g., dovetail grooves) for various sealants (e.g., O-rings, flaps, sealant beads, etc.). Numerous other types of sealant features and sealants may be used as alternatives to accomplish a similar objective. Additionally, the node may further incorporate sealant injection channel(s), adhesive injection port(s), vacuum port(s), and/or other similar features. In certain embodiments, the channel(s) and/or port(s) may be recesses or holes instead of protrusions. The channel(s) and/or port(s) may also include protrusions built in surrounding holes, such that the tips of the protrusions may be flush with or proximate in height to the external surface of the node. In an exemplary embodiment, the holes may be tapped or threaded holes, which may advantageously result in weight savings. In embodiments utilizing protruding ports, the ports may be fabricated with the intent of being broken off upon completion of the bonding process, which may also reduce mass and volume. For purposes of this disclosure, the terms "channel" and/or "port" may be broadly construed to refer to a protrusion, or alternatively a recess or hole, and therefore would encompass any of the embodiments discussed above. A channel and/or port may be an entry point or exit point for a fluid or other substance. Examples of channel(s) and/or port(s) include inlets and/or outlet port(s) and/or channel(s). In an embodiment, a channel and/or port may be a vacuum port. In other embodiments, a channel and/or port need not be a vacuum port but may, for example, be an exit point for excess sealant and/or adhesive.

A port may lead to a space for application of an adhesive, and a channel may provide an area for injection of a substance, as described in embodiments below. A port may be an adhesive inlet port for injecting adhesive into an enclosed and sealed space. The port may alternatively be a vacuum port for applying negative pressure to draw the adhesive towards the end of the space to which the port is coupled. While the adhesive application process and/or substance injection process in the present disclosure may include a combination of vacuum and adhesive application and/or vacuum and substance injection, the disclosure is not limited as such, and adhesive and/or substance may in some exemplary embodiments be injected without use of negative pressure. In these cases, the positive pressure causing the adhesive or substance flow may be sufficient to fill sealed spaces and/or concavities.

A channel, concavity, and/or port may be a part of a node and may be additively manufactured using any suitable AM technique. The channel, concavity, and/or port may be characterized as broken off into portions after it enters and then exits an adhesive region, but may be part of the same channel, concavity, and/or port, respectively. Depending on the embodiment and whether a substance and/or adhesive is injected serially or in parallel, the node may be considered to have one or more channels, concavities, and/or ports. In general, the design of the channels, concavities, and/or ports may enable sequential flow of injectable substances and/or adhesives into specific areas (e.g., concavities, spaces, etc.) between an inner surface of the node and an outer surface of a structure, the edge of which may be inserted into a recess of the node.

To better facilitate assembly, the node may be printed in two or more parts, with the two or more parts being fastened mechanically prior to sealing and/or injection. In an exemplary embodiment, the node may constitute a base structure with sides protruding from the base structure to define a recess for accepting a structure. In other embodiments, the node may constitute additional features, such as connection features to other structures or other structural or functional features that are not explicitly shown in the illustrations herein to avoid unduly obscuring the concepts of the disclosure and to focus on the node-structure interface aspect of the node. These additional features of the node may cause portions of the node to take a different shape or may add structures and geometrical features that are not present in the illustrations herein. These additional features and structures may be additively manufactured along with the remainder of the node, although this may not necessarily be the case, as in some applications, traditional manufacturing techniques such as casting or machining may be used.

After a node is additively manufactured (and, potentially, after a structure is inserted into a recess of a node), one or more enclosed and sealed spaces may be created between the node and a structure, which may be inserted into a recess of the node. A seal member or sealant may seal the enclosed space, e.g., in order for an adhesive to be applied to attach at least a portion of the node to at least a portion of the structure. Aa large number of sealants may be available and may be suitable for use in different embodiments. Some sealants are initially injected as fluids and then cure or otherwise harden. Other sealants have a pre-defined shape and may be deformable. In an exemplary embodiment, a sealant may include both an injectable substance and a sealant with a pre-defined shape.

Sealants may be used to retard flow of the adhesive beyond the corresponding adhesive region. In another exemplary embodiment, sealants are additionally used to hermetically seal the corresponding adhesive region prior to adhesive injection to enable a clean and sterile region for adhesive injection. In yet another embodiment, sealants may similarly be used hermetically seal the corresponding adhesive region after the adhesive is cured in order to keep the adhesive region free from the effects of its environment. This helps reduce and/or diminish potential damage or corrosion over time caused by various pollutants or contaminants. For example, sealants may help inhibit galvanic corrosion that may otherwise be produced by contact between the surface of the structure and the surface of the node over time, e.g., where the two components include dissimilar materials.

Figure 4A:
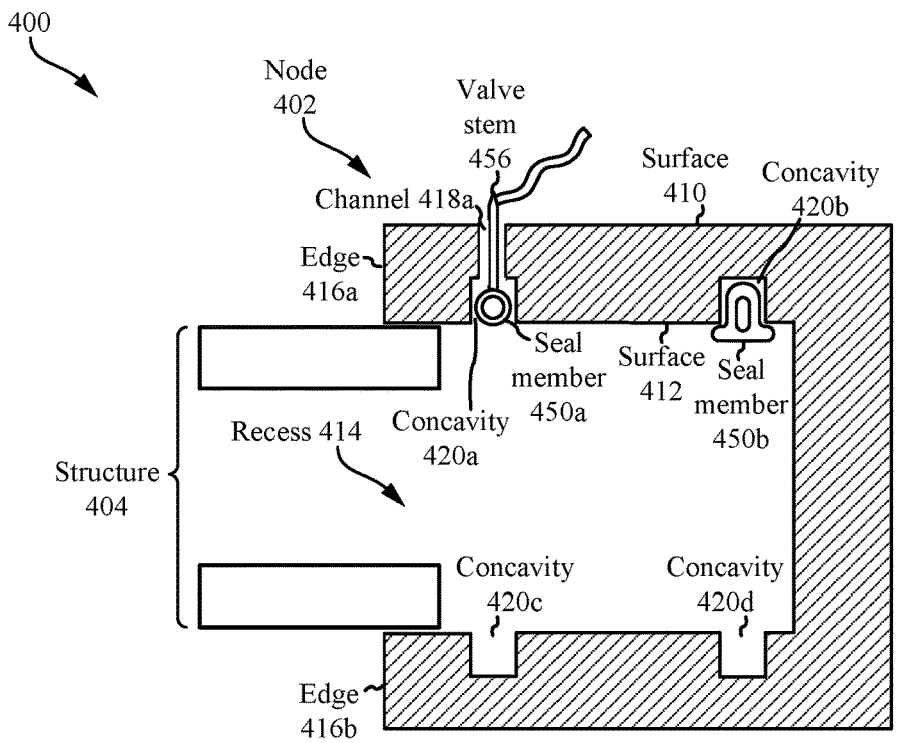
FIGS. 4A-C are side perspective views of sealing mechanisms for realizing an adhesive connection between a node and a structure.
Figure 4B:
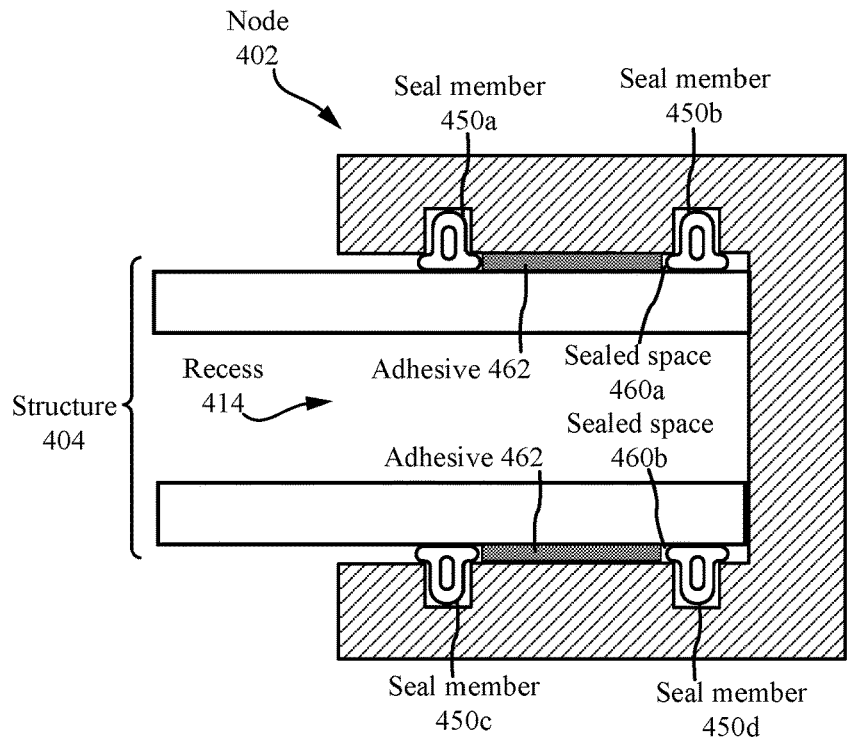
Figure 4C:
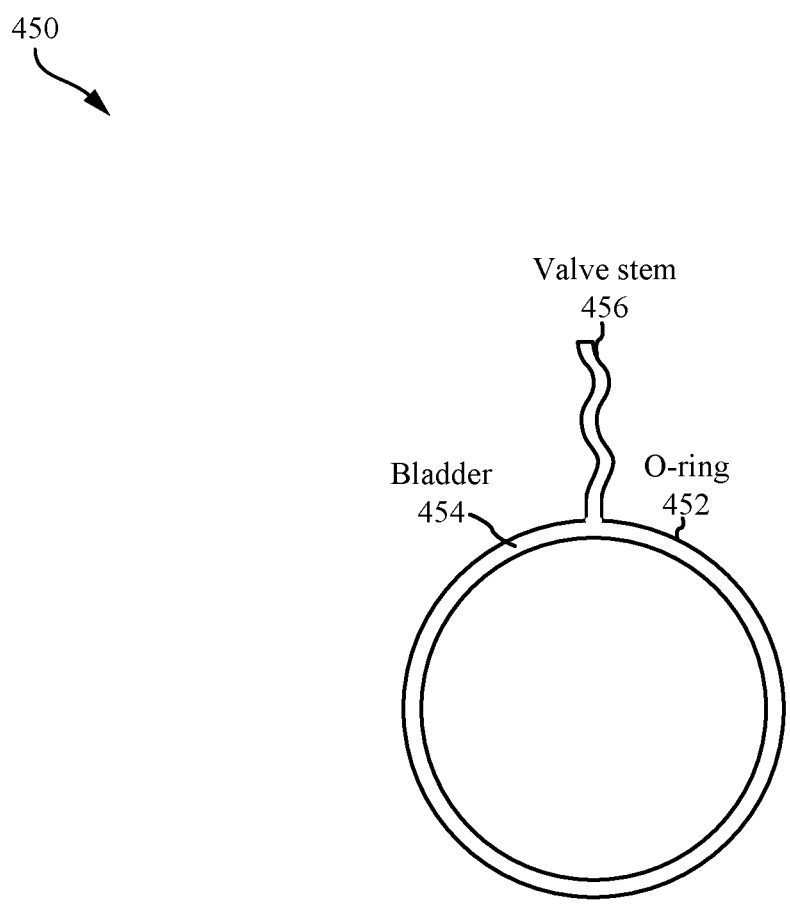

FIGS. 4A-C illustrate a side perspective view 400 of a node 402 having at least one seal member 450 that may receive an structure 404, in accordance with the present disclosure. The view 400 may be a cross-sectional view. In an exemplary embodiment, the node 402 is additively manufactured. The node 402 may be constructed from a plastic, metal, alloy, or any suitable material or combination thereof. The structure 404 may be a simple, single-material panel, a multi-layered panel a sandwiched panel (e.g., with a honeycomb or lattice structure arranged between face sheets), or another type of structure that may be full or hollow, or somewhere in between. In one embodiment, the structure 404 may be an extrusion that includes one or more tubes and, for example, such tubes may have varying cross sections (e.g., a first cross section of a first tube may be different from a second cross section of a second tube). While the structure 404 is illustrated as open, the structure 404 may be fully or partially closed. The components in FIGS. 4A-C are made transparent for clarity, although they may or may not be partially or fully transparent in various applications.

The node 402 may have a first surface 410, which may be an exterior surface. Further, the node 402 may have a second surface 412, which may be an interior surface. The first surface 410 and the second surface 412 may be joined at the edges 416a-b of the node 402. The first surface 410 and the second surface 412 of the node 402 may protrude (e.g., at the edges 416a-b) to thereby form a recess 414 for accepting the structure 404. For example, the first surface 410 and the second surface 412 may joined, as illustrated, and the second surface 412 may bound the recess 414.

As illustrated, a channel 418a may be formed from the first surface 410 to the second surface 412. The channel 418a may be substantially hollow at one point and, therefore, the channel 418a may be suitable to carry an injected substance from the first surface 410 to the second surface 412. The channel 418a may provide a space from the first surface 410 to a concavity 420a of the second surface 412. Accordingly, the second surface 412 may bound at least one concavity 420a-d. Each concavity 420a-d may be a substantially open space.

While the second surface 412 is illustrated with four concavities 420a-d, more or fewer concavities may be present in other embodiments. In embodiments, each concavity 420a-d may connect with a channel at one point, similar to the channel 418a from the first surface 410 to the first concavity 420a. Each concavity 420a-d may be larger than the channel 418a in at least one dimension (e.g., a respective one of a length and/or width of the first concavity 420a may be greater than a respective one of a length and/or width of the first channel 418a).

In various embodiments, a seal member 450a-b may be arranged in contact with the second surface 412. A seal member 450a-b may be configured to extend away from the second surface 412 in response to pressure applied by an injected substance, and the channel 418a may carry such an injected substance from the first surface 410 to the second surface 412. For example, the first and second concavities 420a-b may have a respective seal member 450a-b situated therein.

With reference to FIG. 4C, a seal member 450 is illustrated, in accordance with present disclosure. The seal member 450 may be each of the seal members 450a-b of FIG. 4A. The seal member 450 may be an O-ring. In an exemplary embodiment, the O-ring 452 may be substantially hollow and, therefore, the O-ring 452 may include a bladder 454.

The seal member 450 may include a valve stem 456. The valve stem 456 may provide an inlet to the bladder 454. In exemplary embodiments, the valve stem 456 may allow the introduction of air and/or an injected substance into the bladder 454. For example, pressurized air may be injected into the bladder 454 through the valve stem 456 and, thereafter, an injectable substance may be injected into the bladder 454 through the valve stem 456.

Returning to FIG. 4A, the structure 404 may be inserted in the recess 414 of the node 402. Therefore, the second surface 412 may surround at least a portion of the structure 404. The seal members 450a-b may be arranged in the concavities 420a-b when the structure 404 is inserted in the recess 414.

In an exemplary embodiment, a valve stem 456 of a first seal member 450a may be arranged in the channel 418a. In such an arrangement, an open end of the valve stem 456 may be accessible at the first surface 410 at the channel 418a. Pressurized air may be injected in the bladder 454 through the valve stem 456 and/or an injectable substance may be injected in the bladder 454 through the valve stem 456. The introduction of pressurized air and/or injectable substance into the bladder 454 may cause the bladder 454 to expand and, thus, a portion of a seal member 450a-b may extend away from the second surface 412 in response to pressure applied by the injected substance.

By causing the bladder 454 to expand, the first seal member 450a may provide a seal between the second surface 412 of the node 402 and a portion of the structure 404. For example, the seal may be formed as the portion of the structure 404 contacts the second seal member 450b, which may cause the second seal member 450b to at least partially deform, as illustrated. The expansion of the bladder 454 to create the seal after insertion of the structure 404 may prevent damage to the seal members 450a-b (e.g., by reducing or preventing shearing force applied to the seal members 450a-b during insertion of the structure 404).

FIG. 4B illustrates a node 402 after insertion of the structure 404, in accordance with various embodiments of the present disclosure. The structure 404 may be inserted into the recess 414. After insertion of the structure 404 into the recess 414, each seal member 450a-d may be expanded, e.g., by injection of pressurized air and/or injection of an injectable substance (e.g., a curing material, such as a curable sealant or another injectable substance). Accordingly, each seal member 450a-d may contact the structure 404 in order to form seals after insertion of the structure 404.

According to various embodiments, the seal created by the seal members 450a-d and the structure 404 may create enclosed and sealed spaces 460a-b between the node 402 and the structure 404. A vacuum may be created in each of the sealed spaces 460a-b. After creating a vacuum in each of the sealed spaces 460a-b, an adhesive 462 may be applied in each of the sealed spaces 460a-b. The adhesive 462 may adhere the second surface 412 to a portion of the structure 404.

Figure 5A:
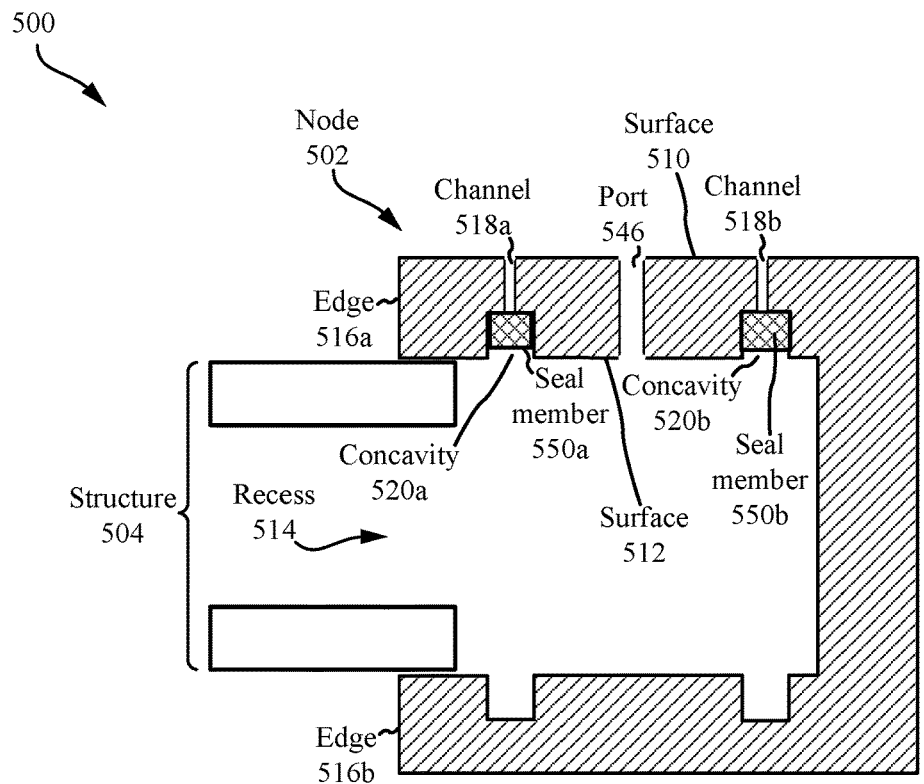
FIGS. 5A-B are side perspective views of sealing mechanisms for realizing an adhesive connection between a node and a structure.
Figure 5B:
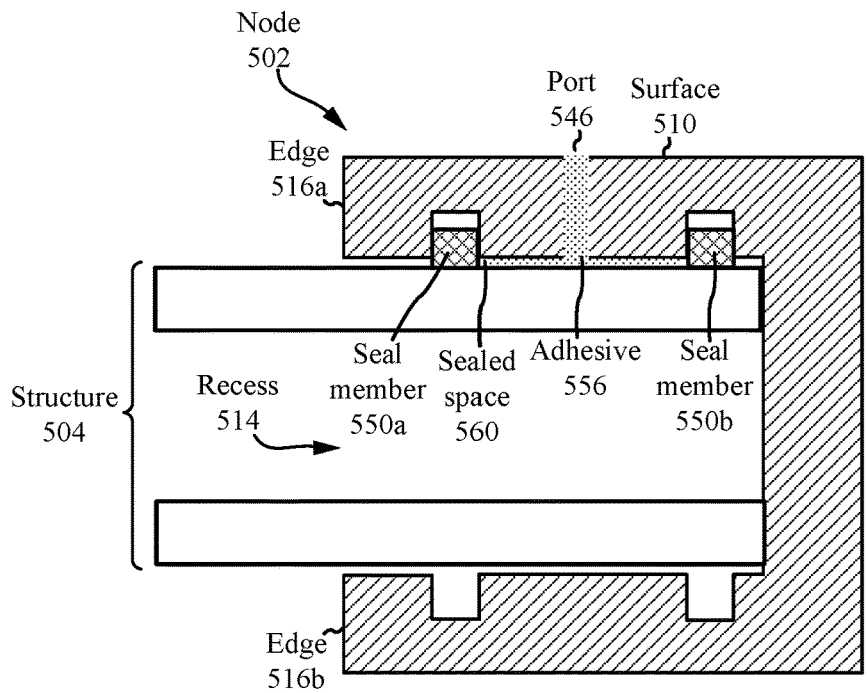

FIGS. 5A-B illustrate a side perspective view 500 of a node 502 having at least one seal member 550a-b that may receive an structure 504, in accordance with the present disclosure. The view 500 may be a cross-sectional view. In an exemplary embodiment, the node 502 is additively manufactured. The node 502 may be constructed from a plastic, metal, alloy, or any suitable material or combination thereof. The structure 504 may be a simple, single-material panel, a multi-layered panel a sandwiched panel (e.g., with a honeycomb or lattice structure arranged between face sheets), or another type of structure that may be full or hollow, or somewhere in between. In one embodiment, the structure 504 may be an extrusion that includes one or more tubes and, for example, such tubes may have varying cross sections (e.g., a first cross section of a first tube may be different from a second cross section of a second tube). While the structure 504 is illustrated as open, the structure 504 may be fully or partially closed. The components in FIGS. 5A-B are made transparent for clarity, although they may or may not be partially or fully transparent in various applications.

The node 502 may have a first surface 510, which may be an exterior surface. Further, the node 502 may have a second surface 512, which may be an interior surface. The first surface 510 and the second surface may be joined at the edges 516a-b of the node 502. The first surface 510 and the second surface 512 of the node 502 may protrude (e.g., at the edges 516a-b) to thereby form a recess 514 for accepting the structure 504, which may be inserted into the recess 514 as shown.

As illustrated, at least one channel 518a-b may be formed from the first surface 510 to the second surface 512. Each channel 518a-b may be substantially hollow at one point and, therefore, each channel 518a-b may be suitable to carry pressurized air and/or an injected substance from the first surface to the second surface. Each channel 518a-b may provide a space from the first surface 510 to a respective concavity 520a-b of the second surface 512. Thus, the second surface 512 may bound at least one concavity 520a-b. Each concavity 520a-b may be a substantially open space.

While the second surface 512 is illustrated with a plurality of concavities 520a-b, more or fewer concavities may be present in other embodiments. In embodiments, each concavity 520a-b may connect with a channel at one point, similar to the channel 518a from the first surface 510 to the first concavity 520a. Each concavity 520a-b may be larger than the channels 518a-b in at least one dimension (e.g., a respective one of a length and/or width of the first concavity 520a may be greater than a respective one of a length and/or width of the first channel 518a).

In embodiments, at least one seal member 550a-b may be arranged in contact with the second surface 512. For example, a first seal member 550a may be arranged in the first concavity 520a, and a second seal member 550b may be arranged in the second concavity 520b. Each seal member 550a-b may at least partially contact the second surface 512, e.g., in each concavity 520a-b that is bounded by the second surface 512.

Still referring to FIG. 5A, the structure 504 may be inserted in the recess 514 of the node 502. Therefore, the second surface 512 may surround at least a portion of the structure 504. The seal members 550a-b may be arranged in the concavities 520a-b when the structure 504 is inserted in the recess 514. Before the structure 504 is inserted, however, the seal members 550a-b may be within the concavities 520a-b such that the seal members 550a-b do not extend beyond the concavities 520a-b. In other words, the seal members 550a-b may not extend beyond the second surface 512 before insertion of the structure 504.

Each channel 518a-b may carry such an injected substance from the first surface 510 to a respective concavity 520a-b that is bounded by the second surface 512. Each seal member 550a-b may be configured to extend away from the second surface 512 in response to pressure applied by an injected substance, such as pressurized or compressed air. For example, an injected substance may be introduced in each of the channels 518a-b, and the injected substance may cause each of the seal members 550a-b to shift away from the second surface 512. Each seal member 550a-b may shift at least partially beyond the concavities 520a-b when the injected substance is introduced through the channels 518a-b by way of the first surface 510.

By causing the seal members 550a-b to extend away from the second surface 512 (e.g., potentially out of the concavities 520a-b), the seal members 550a-b may provide a seal between the second surface 512 of the node 502 and a portion of the structure 504. For example, each seal member 550a-b may contact a portion of the structure 504 in order to form seals after insertion of the structure 504. With reference to FIG. 5B, the seals may be formed as the portion of the structure 504 contacts the each seal member 550a-b. The introduction of the injected substance after insertion of the structure 504 into the recess 514 may create the seals and prevent damage to the seal members 550a-b (e.g., by reducing or preventing shearing force applied to the seal members 550a-b during insertion of the structure 504).

According to various embodiments, the seals created by the seal members 550a-b and the structure 504 may create an enclosed and sealed space 560 between the node 502 and the structure 504. The node 502 may include a port 546 that connects the first surface 510 to the second surface 512 at some point. The port 546 may be substantially hollow and may be suitable to carry an adhesive from the first surface 510 to the second surface 12.

A vacuum may be created in the sealed space 560 (e.g., by utilizing at least the port 546). After creating a vacuum in the sealed space 560, an adhesive 556 may be applied in the sealed space 560 through the port 546. The adhesive may adhere the second surface 512 to a portion of the structure 504.

FIGS. 6A-F illustrate a side perspective view 600 of a node 602 having at least one seal member 650a-b that may receive an structure 604, in accordance with the present disclosure. The view 600 may be a cross-sectional view. In an exemplary embodiment, the node 602 is additively manufactured. The node 602 may be constructed from a plastic, metal, alloy, or any suitable material or combination thereof. The structure 604 may be a simple, single-material panel, a multi-layered panel a sandwiched panel (e.g., with a honeycomb or lattice structure arranged between face sheets), or another type of structure that may be full or hollow, or somewhere in between. In one embodiment, the structure 604 may be an extrusion that includes one or more tubes and, for example, such tubes may have varying cross sections (e.g., a first cross section of a first tube may be different from a second cross section of a second tube). While the structure 604 is illustrated as open, the structure 604 may be fully or partially closed. The components in FIGS. 6A-F are made transparent for clarity, although they may or may not be partially or fully transparent in various applications.

The node 602 may have a first surface 610, which may be an exterior surface. Further, the node 602 may have a second surface 612, which may be an interior surface. The first surface 610 and the second surface 612 may be joined at the edges 616*a-b* of the node 602. The first surface 610 and the second surface 612 of the node 602 may protrude (e.g., at the edges 616*a-b*) to thereby form a recess 614 for accepting the structure 604, which may be inserted into the recess 614 as shown.

As illustrated, the second surface 612 may bound at least one concavity 620*a-b*. Each concavity 620*a-b* may be a substantially open space. In embodiments, at least one seal member 650*a-b* may be arranged in contact with the second surface 612. Each seal member 650*a-b* may at least partially contact the second surface 612. For example, each seal member 650*a-b* may be constructed at portions of the second surface 612 at which the second surface 612 is altered to begin a concavity 620*a-b*. For example, respective proximal ends of each of the seal members 650*a-b* may be connected to corners at which the second surface 612 begins to form a concavity 620*a-b*. The seal members 650*a-b* may be additively manufactured or co-printed with the node 602.

The seal members 650*a-b* may be respective first and second flaps, and each of the flaps may be deflectable. In other words, the seal members 650*a-b* may be configured to shift, e.g., in response to pressure applied to the seal members 650*a-b*. For example, the seal members 650*a-b* may rotate at respective proximal ends, e.g., such that respective distal ends of each of the seal members 650*a-b* changes position relative to the second surface 612.

As illustrated, at least one channel 618*a-b* may be formed from the first surface 610 to the second surface 612. Each channel 618*a-b* may be substantially hollow at one point and, therefore, each channel 618*a-b* may be suitable to carry pressurized air and/or an injected substance from the first surface to the second surface 612. Each channel 618*a-b* may provide a space from the first surface 610 to a respective concavity 620*a-b* of the second surface 612.

While the second surface 612 is illustrated with a plurality of concavities 620*a-b*, more or fewer concavities may be present in other embodiments. In embodiments, each of the concavities 620*a-b* may connect with a channel at one point, similar to the channel 618*a* from the first surface 610 to the first concavity 620*a*. Each of the concavities 620*a-b* may be larger than the channels 618*a-b* in at least one dimension (e.g., a respective one of a length and/or width of the first concavity 620*a* may be greater than a respective one of a length and/or width of the first channel 618*a*).

In embodiments, at least one seal member 650*a-b* may be arranged in contact with the second surface 612. For example, a first seal member 650*a* may be arranged where the second surface 612 begins to bound the first concavity 620*a* at a first position, and a second seal member 650*b* may be arranged where the second surface 612 begins to bound the first concavity 620*a* at a second position. Each of the seal members 650*a-b* may at least partially contact the second surface 612 at a respective proximal end, and each seal member 650*a-b* may extend away from the concavities 620*a-b* so that a respective distal end of each of the seal members 650*a-b* is arranged in the recess 614.

Each of the channels 618*a-b* may carry such an injected substance (e.g., pressurized or compressed air, a curable material, a sealant material, etc.) from the first surface 610 to a respective concavity 620*a-b* that is bounded by the second surface 612. Each of the seal members 650*a-b* may be configured to extend away from the second surface 612 in response to pressure applied by an injected substance. For example, an injected substance may be introduced in each of the channels 618*a-b*, and the injected substance may cause each of the seal members 650*a-b* to shift away from the second surface 612.

Figure 6A:
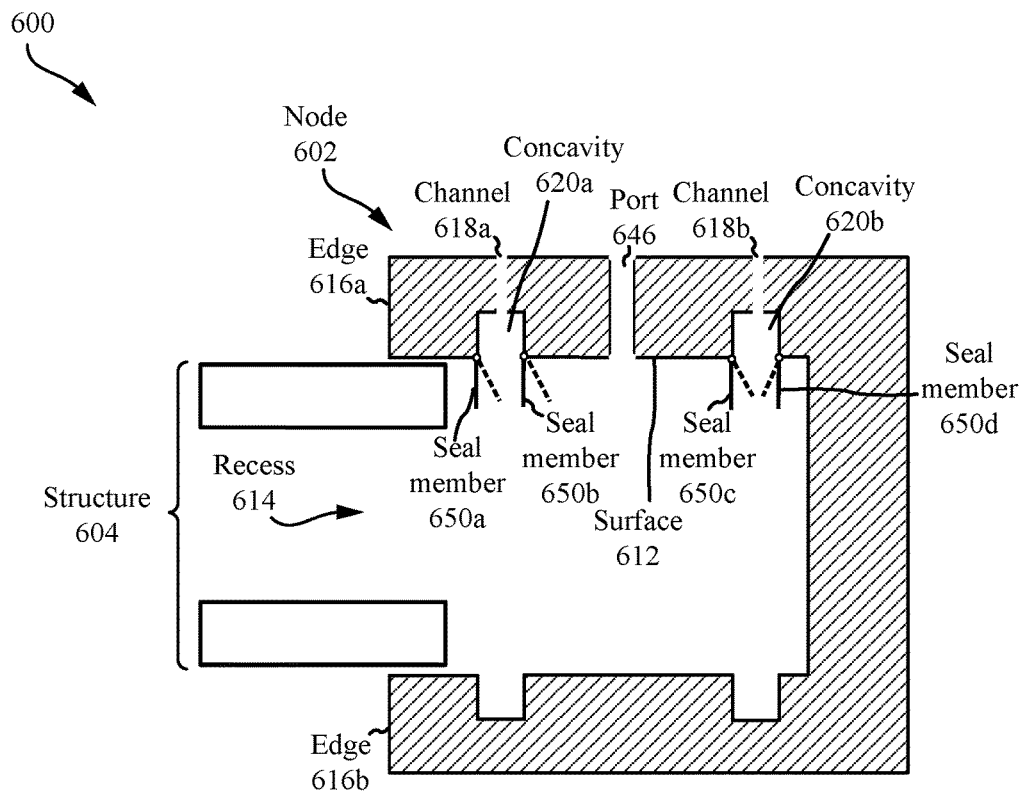
FIGS. 6A-F are side perspective views of sealing mechanisms for realizing an adhesive connection between a node and a structure.
Figure 6B:
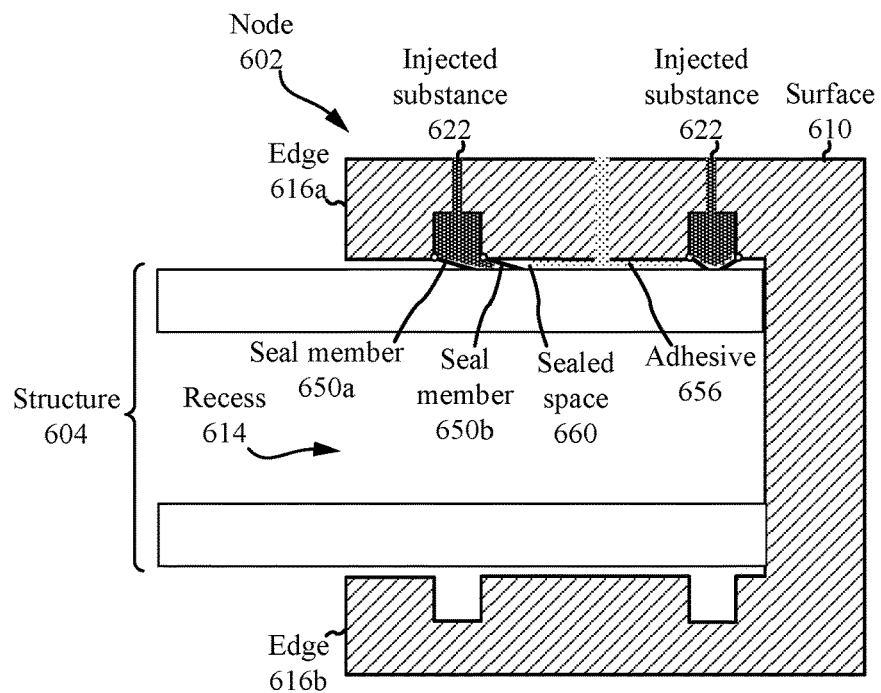

Turning to FIG. 6B, the structure 604 may be inserted in the recess 614 of the node 602. Therefore, the second surface 612 may surround at least a portion of the structure 604. The seal members 650*a-b* may extend into the recess 614. The insertion of the structure 604 into the recess 614 may cause each of the seal members 650*a-b* to deflect toward the second surface 612 in response to pressure applied by the structure 604 during insertion into the recess 614. For example, each distal end of each seal member 650*a-b* may contact a portion of the structure 604, and as the structure 604 is inserted into the recess 614, each distal end of each seal member 650*a-b* may deflect or shift toward the second surface 612 while in contact with the structure 604.

After insertion of the structure 604 into the recess 614, the seal members 650*a-b* may provide a seal between the second surface 612 of the node 602 and a portion of the structure 604. For example, each seal member 650*a-b* may contact a portion of the structure 604 in order to form the seal after insertion of the structure 604. Still with reference to FIG. 6B, the seal may be formed as the portion of the structure 604 contacts the each seal member 650*a-b*.

An injected substance 622 may be introduced through a channel 618*a*. In one embodiment, the injected substance 622 may be a curable material. The injected substance 622 may apply pressure to the seal members 650*a-b*, which may cause the distal ends of the seal members 650*a-b* to shift away from the second surface 612. The structure 604 may apply an opposing pressure after insertion into the recess 614 that causes each of the seal members 650*a-b* to shift toward the second surface 612. Thus, the seal members 650*a-b* may form a seal between the second surface 612 and the structure 604 when the structure 604 is inserted into the recess 614 and the injected substance 622 is received through the channels 618*a-b*.

According to various embodiments, the seal created by the seal members 650*a-b* and the structure 604 may create an enclosed and sealed space 660 between the node 602 and the structure 604. For example, the seal members 650*a-b* may seal the space 660 at one end (e.g., proximate to the first concavity 620*a*), whereas one or more other seal members described herein my seal the space 660 at another end (e.g., proximate to the second concavity 620*b*). In another example, another end of the space 660 may be sealed where the structure 604 is flush with the second surface 612 in the recess 614.

In one embodiment, the node 602 may include a port 646 that connects the first surface 610 to the second surface 612 at some point. The port 646 may be substantially hollow and may be suitable to carry an adhesive from the first surface 610 to the second surface 612.

A vacuum may be created in the sealed space 660 (e.g., by utilizing at least the port 646). After creating a vacuum in the sealed space 660, an adhesive 656 may be applied in the sealed space 660 through the port 646. The port 646 may receive an adhesive 656 and carry the adhesive from the first surface 610 to the second surface 612. The adhesive 656 may be received in the sealed space 660. The adhesive 656 may adhere the second surface 612 to at least a portion of the structure 604. Further, the adhesive 656 may apply positive pressure to at least one of the seal members (e.g., the seal member 650b), causing the at least one seal member 650b to deflect away from the second surface 612 and toward the structure 604.

While FIGS. 6A-B illustrate two seal members 650a-b configured to shift in a same direction, the present disclosure comprehends aspects in which a third seal member 650c may shift in a different direction than a fourth seal member 650d. For example, the third seal member 650c and the fourth seal member 650d may be substantially similar to the seal members 650a-b, but may be arranged such that the distal ends of each of the seal members 650c-d are deflected inward toward the concavity 620b in response to pressure applied by insertion of the structure 604. Accordingly, the distal ends of the seal members 650c-d may shift toward one another in response to pressure applied by the structure 604, but away from one another in response to pressure applied by the injected substance 622.

Figure 6C:
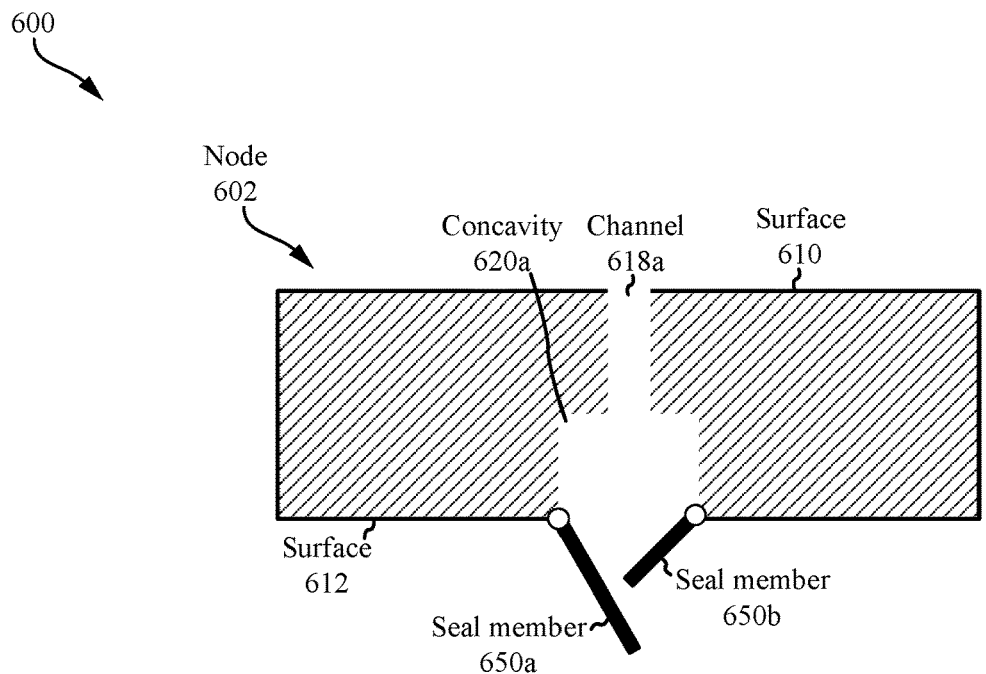
Figure 6D:
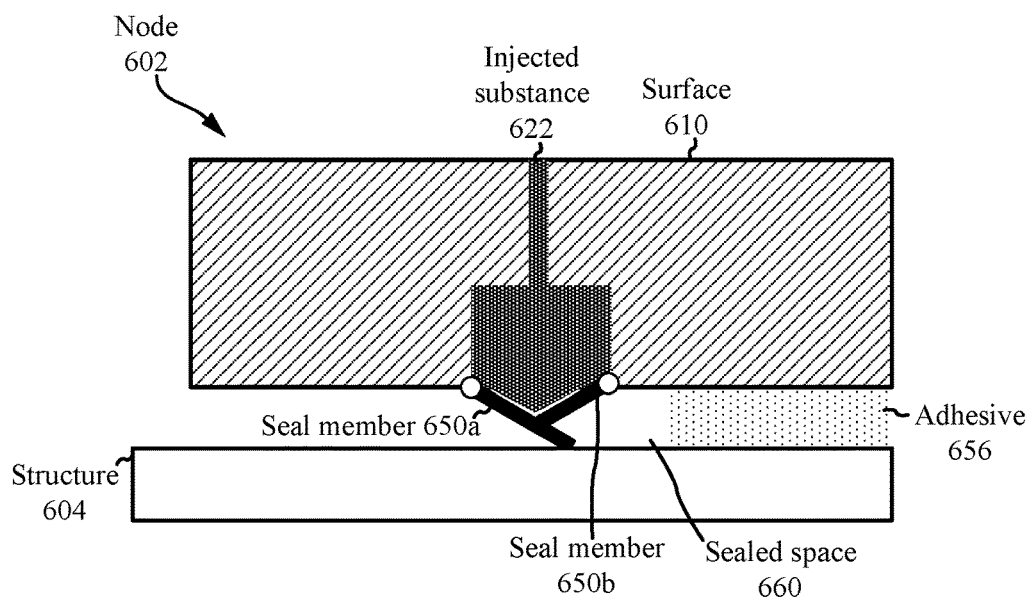

Turning to FIGS. 6C-D, an embodiment of seal members 650a-b is illustrated. In FIG. 6C, the first seal member 650a may be arranged opposing the second seal member 650b. The second seal member 650b may be arranged such that the distal end of the second seal member 650b overlaps with the distal end of the first seal member 650a. Further, the second seal member 650b may be relatively smaller in at least one dimension than the first seal member 650a (e.g., a length of the second seal member 650b may be shorter than a length of the first seal member 650a).

As shown in FIG. 6D, the structure 604 may be inserted in the recess 614 of the node 602. Therefore, the second surface 612 may surround at least a portion of the structure 604. The insertion of the structure 604 into the recess 614 may cause each of the seal members 650a-b to deflect toward the second surface 612 in response to pressure applied by the structure 604 during insertion into the recess 614. In particular, the structure 604 may contact the distal end of the first seal member 650a, causing the first seal member 650a to shift toward the second surface 612. In addition, the first seal member 650a may contact the second seal member 650b, e.g., at the distal end of the second seal member 650b. However, the second seal member 650b may not contact the structure 604.

After insertion of the structure 604 into the recess 614, the seal members 650a-b may provide a seal between the second surface 612 of the node 602 and a portion of the structure 604. For example, the first seal member 650a may contact a portion of the structure 604 and a distal end of the second seal member 650b may contact a portion of the first seal member 650b, which may form the seal after insertion of the structure 604. Still with reference to FIG. 6B, the seal may be formed as the portion of the structure 604 contacts the first seal member 650a, and the first seal member 650a contacts the second seal member 650b.

An injected substance 622 (e.g., curable material or other sealant) may be introduced through the channel 618a. The injected substance 622 may apply pressure to the seal members 650a-b, which may cause the distal end of the second seal member 650b to shift away from the second surface 612 and apply pressure to the first seal member 650a. The structure 604 may apply an opposing pressure after insertion into the recess 614 that causes the first seal member 650a to shift toward the second surface 612 and into contact with second seal member 650b.

According to various embodiments, the seal created by the seal members 650a-b and the structure 604 may create an enclosed and sealed space 660 between the node 602 and the structure 604. For example, the seal members 650a-b may seal the space 660 at one end (e.g., proximate to the first concavity 620a), whereas one or more other seal members described herein my seal the space 660 at another end (e.g., proximate to the second concavity 620b). In another example, another end of the space 660 may be sealed where the structure 604 is flush with the second surface 612 in the recess 614.

In one embodiment, the node 602 may include a port 646 that connects the first surface 610 to the second surface 612 at some point. The port 646 may be substantially hollow and may be suitable to carry an adhesive from the first surface 610 to the second surface 612.

A vacuum may be created in the sealed space 660 (e.g., by utilizing at least the port 646). After creating a vacuum in the sealed space 660, an adhesive 656 may be applied in the sealed space 660 through the port 646. The port 646 may receive an adhesive 656 and carry the adhesive from the first surface 610 to the second surface 612. The adhesive 656 may be received in the sealed space 660. The adhesive 656 may adhere the second surface 612 to at least a portion of the structure 604. Further, the adhesive 656 may apply positive pressure to at least one of the seal members (e.g., the seal member 650b), causing the second seal member 650b to deflect toward the second surface 612 and into the first seal member 650a. The injected substance 622, the adhesive 656, and the structure 604 may maintain the seal created by the seal members 650a-b.

Figure 6E:
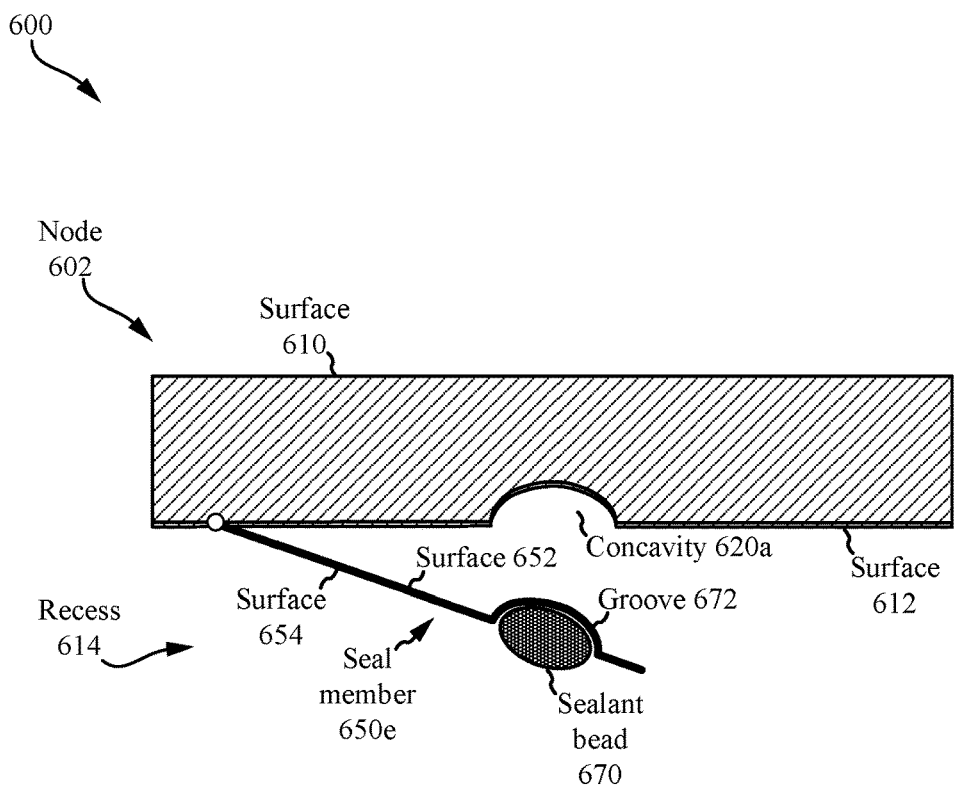
Figure 6F:
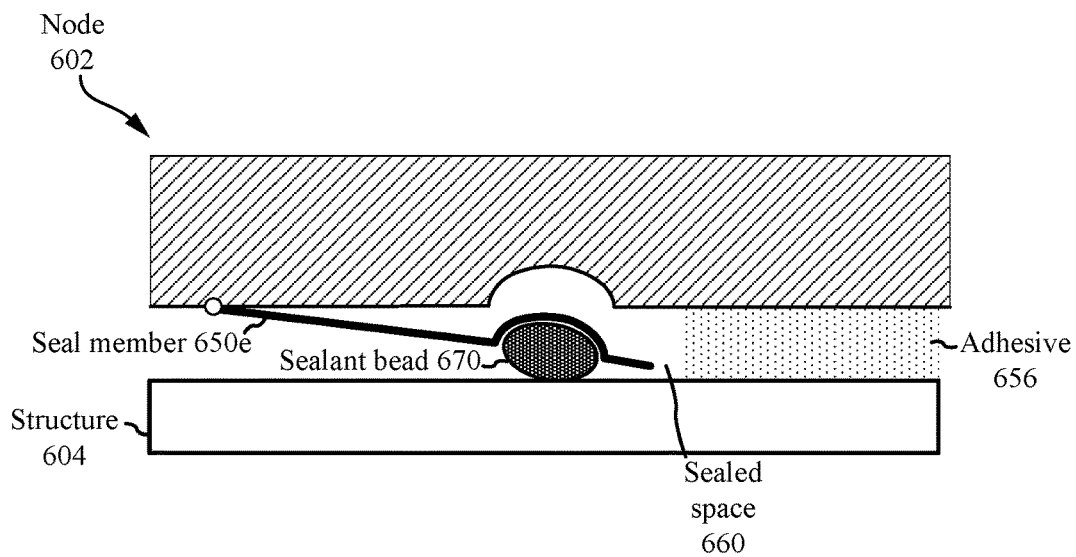

Now with reference to FIGS. 6E-F, an embodiment of a seal member 650e is illustrated. As illustrated, the seal member 650e may include an inner surface 652 that faces toward the second surface 612 of the node 602 and an outer surface 654 that faces away from the second surface 612. The outer surface 654 of the seal member 650e may have arranged thereon a sealant bead 670. The seal member 650e may be shaped with a groove 672. For example, the seal member 650e may be configured with a groove 672 so that the seal member 650e is shaped with a curve or bend, which may be substantially arc-like.

The groove 672 may be shaped such that the groove 672 is approximately smaller in at least one dimension than a concavity 620a on the second surface 612. For example, in one embodiment, the concavity 620a may be substantially shaped as an arc, and the concavity 620a may receive at least a portion of the seal member 650e (e.g., at the groove 672) when the seal member 650e shifts toward the second surface 612.

A sealant bead 670 may be arranged in the groove 672. The sealant bead 670 may be applied substantially in the groove 672 before insertion of the structure 604 into the recess 614. The sealant bead 670 may be a curable material.

Referring to FIG. 6F, the structure 604 may be inserted into the recess 614, and the structure 604 may contact the seal member 650e. In response to pressure applied by the structure 604, the seal member 650e may shift toward the second surface 612. In particular, the seal member 650e may rotate or shift about a proximal end, and the distal end of the seal member 650e may shift toward the second surface 612, e.g., when the structure 604 is inserted into the recess 614 and causes pressure to be applied to the seal member 650e.

In an embodiment, the insertion of the structure 604 may cause the seal member 650e (e.g., at the groove 672) to shift toward the concavity 620a. For example, at least a portion of the seal member 650e (e.g., at the groove 672) may shift into the concavity 620a when the structure 604 is inserted into the recess 614 and, therefore, at least a portion of the groove 672 may be arranged in the concavity 620a after insertion of the structure 604.

The sealant bead 670 may contact the structure 604 after insertion of the structure 604 into the recess 614. As the sealant bead 670 (and, potentially, at least a portion of the seal member 650e) contacts the structure 604, a seal may be created between the second surface 612 of the node 602 and a portion of the structure 604.

According to various embodiments, the seal created by the seal member 650e and the structure 604 may create an enclosed and sealed space 660 between the node 602 and the structure 604. For example, the seal member 650e may seal the space 660 at one end (e.g., proximate to the first concavity 620a), whereas one or more other seal members described herein my seal the space 660 at another end (e.g., proximate to the second concavity 620b). In another example, another end of the space 660 may be sealed where the structure 604 is flush with the second surface 612 in the recess 614.

As illustrated in FIGS. 6A-B, the node 602 may include a port 646 that connects the first surface 610 to the second surface 612 at some point. The port 646 may be substantially hollow and may be suitable to carry an adhesive from the first surface 610 to the second surface 612.

As illustrated in FIG. 6F, an enclosed and sealed space 660 may be formed, sealed at least by the seal member 650e (e.g., where the sealant bead 670 contacts the structure 604). A vacuum may be created in the space 660. An adhesive 656 may be applied in the sealed space 660 (e.g., after drawing a vacuum). For example, the adhesive 656 may be carried into the space 660 (e.g., as shown in FIGS. 6A-B through the port 646).

The adhesive 656 may adhere the second surface 612 to at least a portion of the structure 604. Further, the adhesive 656 may apply positive pressure to the seal member 650e by contacting the inner surface 652 of the seal member 650e. The adhesive 656 may apply pressure that causes the distal end of the seal member 650e to rotate away from the second surface 612, while the structure 604 simultaneously applies pressure that causes the distal end of the seal member 650e to rotate toward the second surface 612. Thus, the seal member 650e may retain the adhesive 656 within the space 660 after insertion of the structure 604 into the recess 614.

FIGS. 7A-E illustrate a side perspective view 700 of a node 702 having at least one seal member 750 that may receive an structure 704, in accordance with the present disclosure. The view 700 may be a cross-sectional view. In an exemplary embodiment, the node 702 is additively manufactured. The node 702 may be constructed from a plastic, metal, alloy, or any suitable material or combination thereof. The structure 704 may be a simple, single-material panel, a multi-layered panel a sandwiched panel (e.g., with a honeycomb or lattice structure arranged between face sheets), or another type of structure that may be full or hollow, or somewhere in between. In one embodiment, the structure 704 may be an extrusion that includes one or more tubes and, for example, such tubes may have varying cross sections (e.g., a first cross section of a first tube may be different from a second cross section of a second tube). While the structure 704 is illustrated as open, the structure 704 may be fully or partially closed. The components in FIGS. 7A-F are made transparent for clarity, although they may or may not be partially or fully transparent in various applications.

The node 702 may have a first surface 710, which may be an exterior surface. Further, the node 702 may have a second surface 712, which may be an interior surface. The first surface 710 and the second surface 712 may be joined at the edges 716a-b of the node 702. The first surface 710 and the second surface 712 of the node 702 may protrude (e.g., at the edges 716a-b) to thereby form a recess 714 for accepting the structure 704. The second surface 712 may bound the recess 714.

As illustrated, a channel 718a may be formed from the first surface 710 to the second surface 712. The channel 718a may be substantially hollow at one point and, therefore, the channel 718a may be suitable to carry an injected substance from the first surface 710 to the second surface 712. The channel 718a may provide a space from the first surface 710 to a concavity 720a of the second surface 712. The second surface 712 may bound at least one concavity 720a-b. Each concavity 720a-b may be a substantially open space.

While the second surface 712 is illustrated with a plurality of concavities (e.g., including the concavity 720a), more or fewer concavities may be present in other embodiments. In embodiments, each concavity 720a-b may connect with a channel at one point, similar to the channel 718a from the first surface 710 to the first concavity 720a. Each concavity 720a-b may be larger than the channel 718a in at least one dimension (e.g., a respective one of a length and/or width of the first concavity 720a may be greater than a respective one of a length and/or width of the channel 718a).

In various embodiments, a seal member 750a may be arranged in contact with the second surface 712. A seal member 750a may be configured to extend away from the second surface 712 in response to pressure applied by an injected substance, and the channel 718a may carry such an injected substance from the first surface 710 to the second surface 712. For example, the first concavity 720a may have a seal member 750a at least partially situated therein.

Figure 7A:
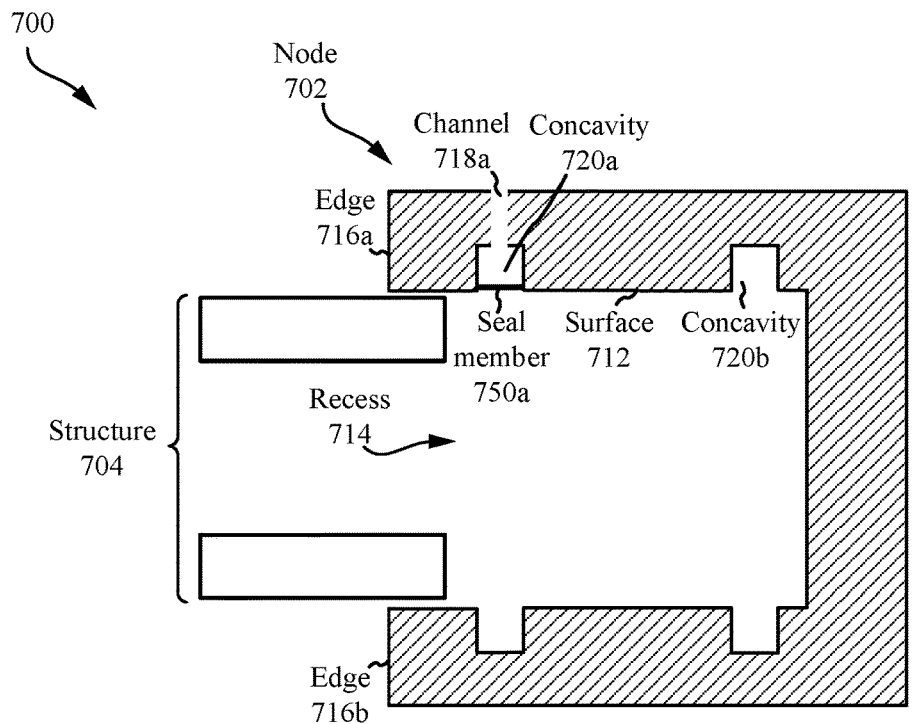
FIGS. 7A-E are side perspective views of sealing mechanisms for realizing an adhesive connection between a node and a structure.
Figure 7B:
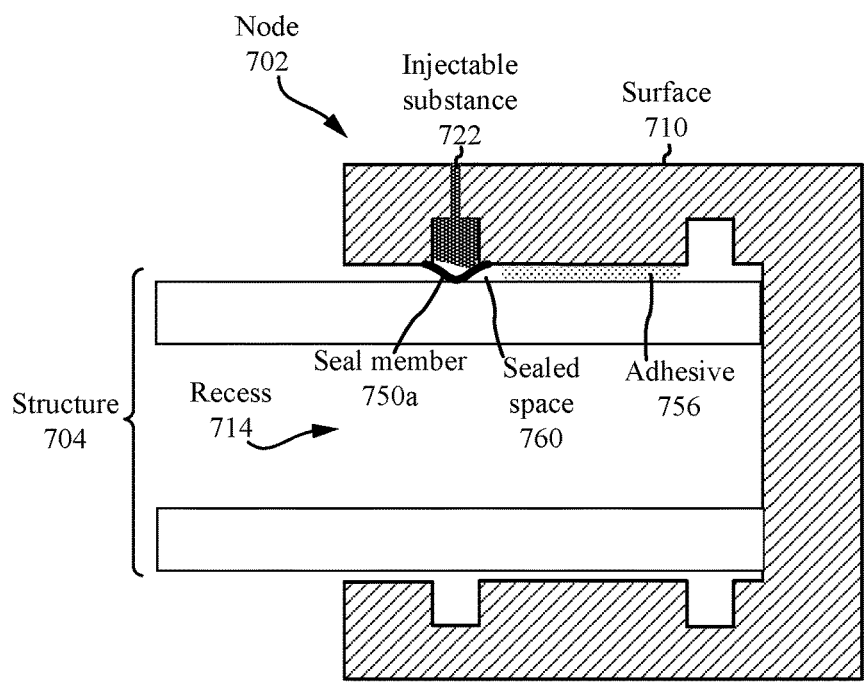
Figure 7C:
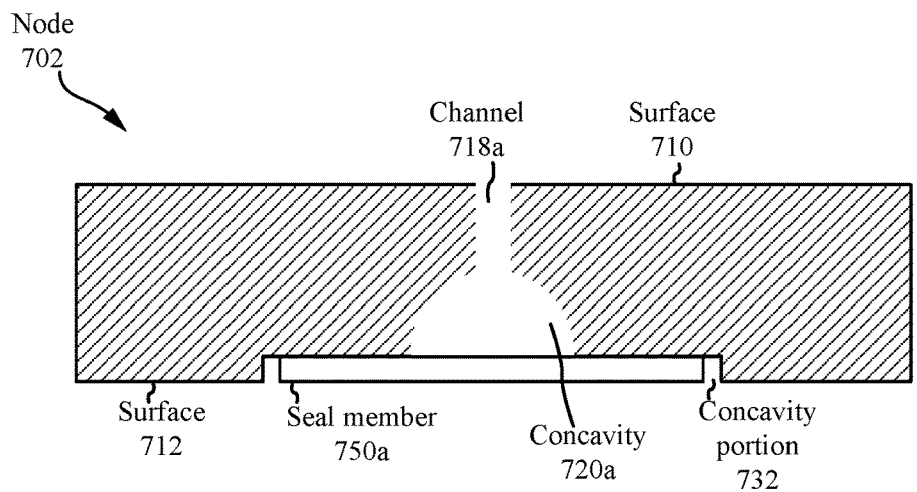

With reference to FIG. 7C, the seal member 750a is illustrated, in accordance with present disclosure. The seal member 750a may be an elastomeric material, such as rubber. The seal member 750a may be applied to the node 702 on the second surface 712. For example, the seal member 750a may be robotically applied to the second surface 712. The seal member 750a may be applied to the second surface 712 with an adhesive, causing the seal member 750a to adhere to the second surface 712.

The seal member 750a may be applied to the second surface 712 so that the seal member 750a is arranged at least partially within a concavity 720a. For example, before insertion of the structure 704 into the recess 714, the seal member 750a may be substantially within the concavity 720a. For example, the seal member 750a may not extend out of the concavity 720a and beyond the second surface 712 at one point.

In the illustrated embodiment, the concavity 720a may not be of uniform dimensions throughout. For example, the concavity 720a may include a portion 732 where the concavity 720a opens at the second surface 712 into the recess 714. The portion 732 of the concavity may be relatively wider than the remaining portion of the concavity 720a, and the concavity 720a may narrow (e.g., taper) toward the channel 718a. Thus, ledges may be formed in the second surface 712 where the portion 732 narrows into the remaining portion of the concavity 720a. The seal member 750a may contact the second surface 712 in the portion 732 of the concavity 720a at the ledges formed where the second surface 712 bounds the portion 732 of the concavity 720a. Accordingly, the seal member 750a may be situated within the portion 732 of the concavity 720a, without extending into the remaining portion of the concavity 720a.

Figure 7D:
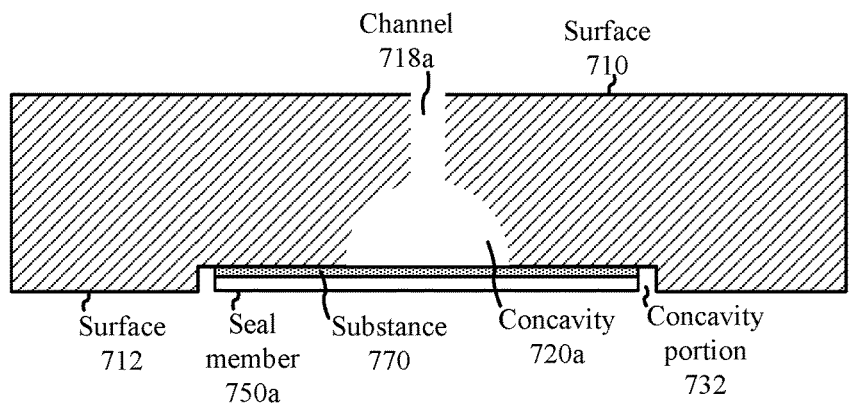

FIG. 7D illustrates one embodiment of the seal member 750a applied to the second surface 712. According to the illustrated embodiment, a substance 770 may be applied to the second surface 712, e.g., within the concavity 720a. The substance 770 may be deposited between the seal member 750a and the second surface 712 before the seal member 750a is attached. For example, the substance 770 may provide a base (e.g., a substantially flat surface) for attaching the seal member 750a to the second surface 712, and/or the substance 770 may adhere the seal member 750a to the second surface 712.

In one embodiment, the substance 770 may be temporary. That is, the substance 770 may be suitable to temporarily provide a base for attaching the seal member 750a to the second surface 712. Accordingly, the substance 770 may be a temporary wash out substance (e.g., wash out adhesive).

In one embodiment, the substance 770 may be expandable and, therefore, the substance 770 may be deformable. For example, the substance 770 may be a film-forming substance. The substance 770 may be thermally activated. Thus, the substance 770 may be deformable (e.g., expandable) in response to an elevated temperature (e.g., greater than 120 degrees Fahrenheit, greater than 150 degrees Fahrenheit, greater than 180 degrees Fahrenheit, etc.).

Returning to FIG. 7A, the node 702 may include the recess 714, which may be suitable for insertion of the structure 704. Therefore, the second surface 712 may bound the recess 714. The seal member 750a may be arranged in the concavities 720a when the structure 704 is inserted in the recess 714.

Returning to FIG. 7B, the node 702 is illustrated after insertion of the structure 704, in accordance with various embodiments of the present disclosure. The structure 704 may be inserted into the recess 714. After insertion of the structure 704 into the recess 714, the seal member 750a may be deformed, as shown. The deformation of the seal member 750a may cause the seal member 750a to protrude from the concavity 720a and contact the structure 704.

Figure 7E:
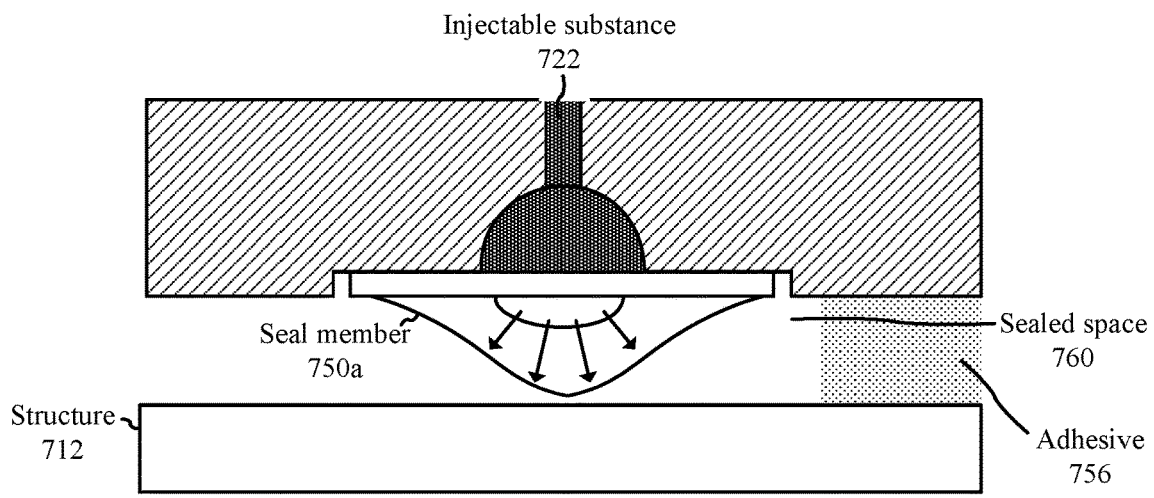

With reference to FIG. 7E, the seal member 750a may be deformed by injection of pressurized air and/or injection of an injectable substance 722 (e.g., a curing material, such as a curable sealant or another injectable substance). For example, the injectable substance 722 may be introduced through the channel 718a and apply pressure to the side of the seal member 750a that is adhered to the second surface 712. Accordingly, the seal member 750a may contact the structure 704 in order to form a seal after insertion of the structure 704.

In one embodiment, the substance 770 may be at least partially removed before introduction of injectable substance 722. For example, the substance 770 may be at least partially washed out before the injectable substance 722 is received through the channel 718a.

In one embodiment, the seal member 750a may be at least partially deformed by pressure applied by the substance 770 when the substance is expanded 770. For example, the substance 770 may be exposed to a relatively elevated temperature, which may cause the substance 770 to expand against the seal member 750a, thereby deforming the seal member 750a so that the seal member 750a extends away from the second surface 712 and contacts the structure 704.

According to various embodiments, the seal created by the seal member 750a and the structure 704 may create an enclosed and sealed space 760 between the node 702 and the structure 704. For example, the seal member 750a may seal the space 760 at one end (e.g., proximate to the first concavity 720a), whereas one or more other seal members described herein may seal the space 760 at another end (e.g., proximate to the second concavity 720b). In another example, another end of the space 760 may be sealed where the structure 704 is flush with the second surface 712 in the recess 714.

A vacuum may be created in the sealed space 760. After creating a vacuum in the sealed space 760, an adhesive 756 may be applied in the sealed space 760. The adhesive 756 may adhere the second surface 712 to a portion of the structure 704.

Figure 8:
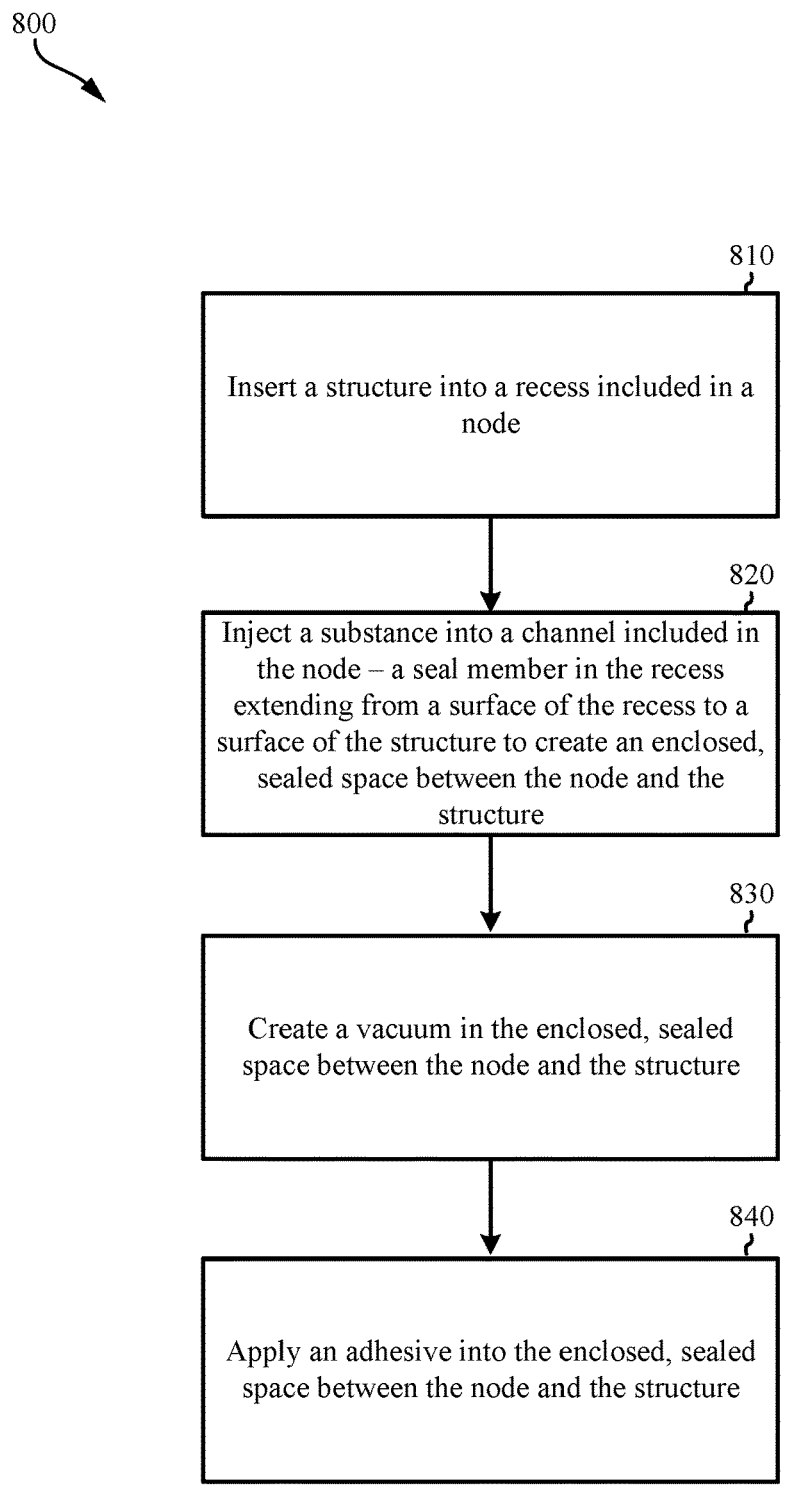
FIG. 8 is a flow diagram of an exemplary method of sealing mechanisms for realizing an adhesive connection between a node and a structure.

FIG. 8 is a flow diagram of a method 800 of forming a seal between an additively manufactured node and a structure. The node may include a recess and a channel to a sealing member in the recess. The structure may include one or more tubes, which may feature varying cross sections. The structure may be inserted into the recess (operation 810).

A substance may be injected into the channel of the node (operation 820). The substance may include compressed air and/or a curable material. The injection of the substance may cause the sealing member to extend from a surface of the node that bounds the recess to a surface of the structure. As the sealing member extends from the surface of the node to the surface of the structure, the sealing member may contact the surface of the structure to create an enclosed, sealed space between the node and the structure.

In some embodiments, the sealing member may be arranged in a concavity that is bounded by a surface of the node. The sealing member may be substantially within the concavity when the structure is inserted into the recess. However, the sealing member may at least partially extend out of the concavity to contact the structure in response to pressure applied by the injection of the substance.

In one embodiment, the sealing member may include a bladder configured to receive the injected substance. For example, the sealing member may be an O-ring with a bladder. The injection of the substance may cause the bladder to expand in response to pressure applied by the injected substance.

In one embodiment, the sealing member may include a first flap connected to a surface of the node, and the first flap may shift away from the surface of the node in response to pressure applied by injection of the substance.

In a further embodiment, the sealing member may include a second flap that is connected to the surface of the node. For example, the second flap may be arranged opposing the first flap, with a distal end of the second flap at least partially overlapping a distal end of the first flap. The second flap may shift away from the surface in response to pressure applied by the injection of the substance, and the distal end of the second flap may at least partially contact a portion of the first flap. The second flap may be relatively smaller in at least one dimension than the first flap (e.g., the second flap may be shorter than the first flap).

In a further embodiment, the first flap may include an outer surface that faces away from a surface of the node to which the first flap is connected. A sealant bead may be arranged on the outer surface of the first flap (e.g., at least partially within a groove formed in the first flap). The sealant bead may at least partially contact the structure in response to pressure applied by the injected substance, e.g., in order to create the enclosed and sealed space.

In various embodiments, one or more of the aforementioned flaps may be co-printed and/or additively manufactured with the node.

In one embodiment, the sealing member may include an elastomeric material that is configured to deform in response to pressure applied by the injection of the substance. The deformed elastomeric material may extend away from the surface in response to the pressure applied by the injection of the substance, and may contact the structure in order to form the enclosed and sealed space.

After the enclosed and sealed space is created, a vacuum may be created (e.g., drawn) in the enclosed and sealed space between the node and the structure (operation 830). An adhesive may be applied (e.g., injected) in the enclosed, sealed space (operation 840). The adhesive may at least partially attach the node to the structure. In some embodiments, the vacuum may be held throughout the adhesive application process, and may be disconnected once a complete fill is realized.

Once the enclosed and sealed space is filled with the adhesive and the adhesive application process is complete, port(s) and/or channel(s) (if necessary or desired) may be broken off or sealed. The adhesive may then be allowed to cure. Once the adhesive hardens, the node may be at least partially attached to the structure.

Figure 9:
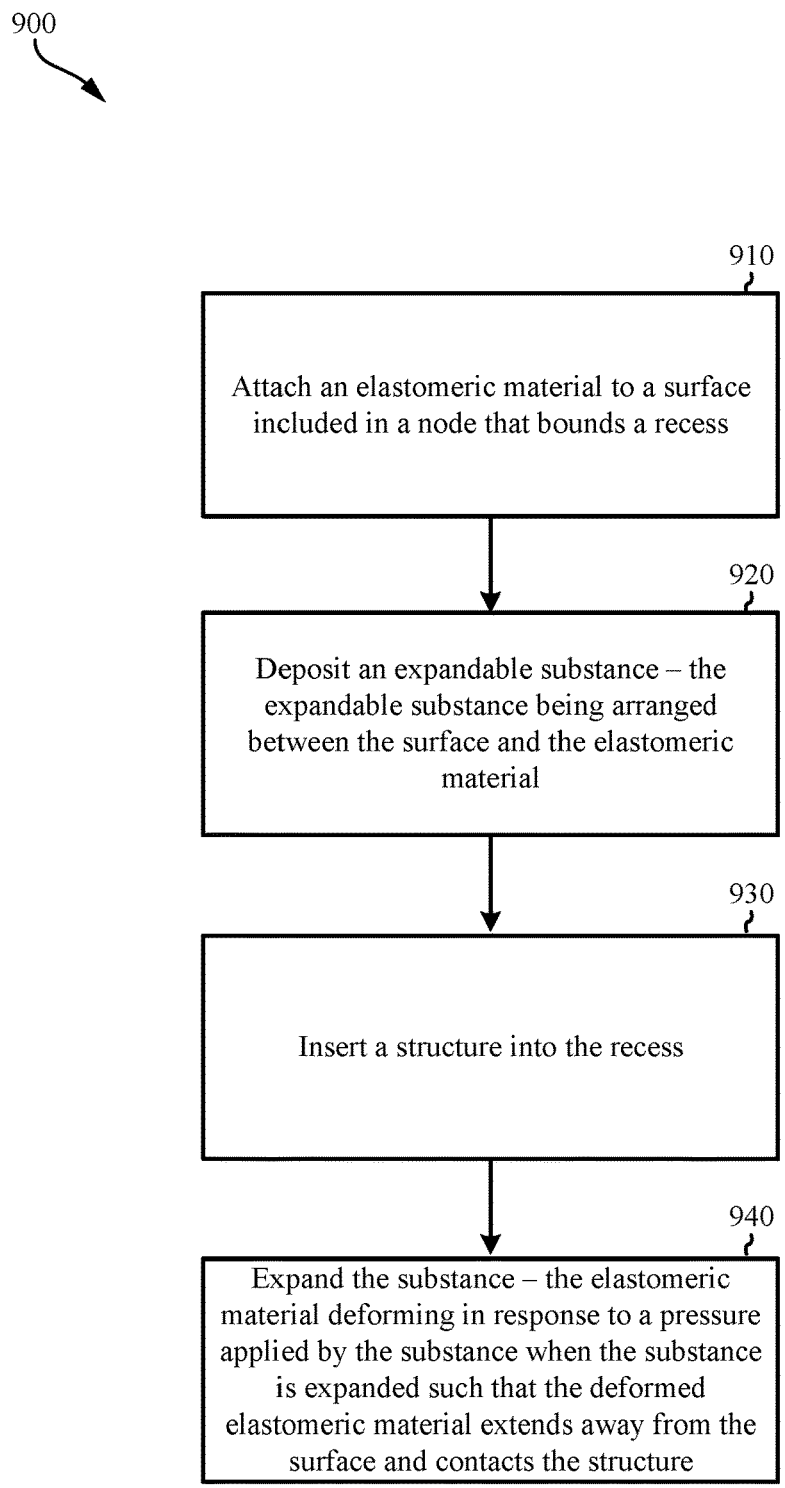
FIG. 9 is a flow diagram of an exemplary method of sealing mechanisms for realizing an adhesive connection between a node and a structure.

FIG. 9 is a flow diagram of a method 900 of forming a seal between an additively manufactured node and a structure. The node may include a surface that bounds a recess. The structure may include one or more tubes, which may feature varying cross sections.

An elastomeric material may be attached to the surface of the node that bounds the recess (operation 910). For example, the elastomeric material may be rubber or another deformable material.

An expandable substance may be deposited on the node (operation 920). In an embodiment, the expandable substance may include a thermally activated substance and/or a film-forming substance. The expandable substance may be arranged between the surface of the node and the elastomeric material. For example, the expandable substance may be deposited before the elastomeric material is attached to the surface of the node. The expandable substance may form a base (e.g., a substantially flat base) for attaching the elastomeric material to the node.

The structure may be inserted into the recess (operation 930). The expandable substance may be expanded (operation 940). The expansion of the substance may cause the elastomeric material to deform in response to a pressure applied by the expandable substance when the substance is expanded. The deformed elastomeric material may extend away from the surface of the node that bounds the recess, and the deformed elastomeric material may contact the structure.

In some embodiments, the deformed elastomeric material may contact the structure to create an enclosed, sealed space between the node and the structure. After the enclosed and sealed space is created, a vacuum may be created (e.g., drawn) in the enclosed and sealed space between the node and the structure. An adhesive may be applied (e.g., injected) in the enclosed, sealed space. The adhesive may at least partially attach the node to the structure. In some embodiments, the vacuum may be held throughout the adhesive application process, and may be disconnected once a complete fill is realized.

Once the enclosed and sealed space is filled with the adhesive and the adhesive application process is complete, port(s) and/or channel(s) (if necessary or desired) may be broken off or sealed. The adhesive may then be allowed to cure. Once the adhesive hardens, the node may be at least partially attached to the structure.

In various embodiments, a single node may connect to two or multiple structures using the features described above. The node may also be extended, elongated, or shaped in any way to enable multiple sets of interface regions (i.e., sets of one or more adhesive regions with sealants and channels as described above to realize a connection) to exist on a single node. For example, in one embodiment, the node is rectangular, with separate interfaces on two or more sides of the rectangular node connecting to different structures via the sealing and/or adhesive process and techniques described above. In other embodiments, the nodes may be constructed to have interface regions in close proximity so that two respective structures may be spaced very closely, or so that the structures may make contact. Numerous embodiments of the node, the structure, and/or the seal member(s) may be contemplated based on the present disclosure and attendant illustrations without departing from the spirit and scope of the present disclosure.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus comprising:
    an additively manufactured node including:
        a first surface;
        a second surface opposite the first surface;
        a third surface non-parallel to the second surface, wherein the second surface and the third surface bound a recess in the node;
        a body separating the first surface from the second surface; and
        a channel formed within the body separating the first surface from the second surface, wherein the channel extends through the body from the first surface to the second surface, and wherein the channel is configured to carry an injected substance from the first surface to the second surface; and a seal member including:
  a first flap with a first proximal end and a first distal end, the first proximal end attached to the second surface at a first attachment point, wherein the first flap is configured to shift about the first attachment point in response to pressure applied by the injected substance; and
  a second flap defined by a second proximal end and a second distal end, the second proximal end attached to the second surface at a second attachment point, the second flap being arranged opposing the first flap with the second distal end of the second flap overlapping the first distal end of the first flap, such that the second flap shifts about the second attachment point in response to contact made by the first distal end with the second distal end, wherein the contact made by the first distal end is made in response to the pressure applied by a structure inserted in the recess.

2. The apparatus of claim 1, wherein the channel comprises a first channel portion and a second channel portion, the first channel portion extending into the body of the additively manufactured node from the first surface, the second channel portion extending into the body from the second surface, wherein the first channel portion meets the second channel portion in the body, and wherein the second channel portion is greater in size than the first channel portion in at least one dimension.

3. An apparatus comprising:
  an additively manufactured node including:
    a first surface;
    a second surface opposite the first surface;
    a third surface non-parallel to the second surface, wherein the second surface and the third surface bound a recess in the node;
    a body separating the first surface from the second surface; and
    a channel formed within the body separating the first surface from the second surface, wherein the channel extends through the body from the first surface to the second surface, and wherein the channel is configured to carry an injected substance from the first surface to the second surface; and
  a seal member including:
    a first flap with a first proximal end and a first distal end, the first proximal end attached to the second surface at a first attachment point, wherein the first flap is configured to shift about the first attachment point in response to pressure applied by the injected substance, and wherein the first flap includes an outer surface that faces away from the second surface; and
    a sealant bead arranged on the outer surface of the first flap.

4. The apparatus of claim 3, wherein the channel comprises a first channel portion and a second channel portion, the first channel portion extending into the body of the additively manufactured node from the first surface, the second channel portion extending into the body from the second surface, wherein the first channel portion meets the second channel portion in the body, and wherein the second channel portion is greater in size than the first channel portion in at least one dimension.

5. An apparatus comprising:
  an injected substance;
  an additively manufactured node including:
    a first surface;
    a second surface opposite the first surface;
    a third surface non-parallel to the second surface, wherein the second surface and the third surface bound a recess in the node;
    a body separating the first surface from the second surface; and
    a channel formed within the body separating the first surface from the second surface, wherein the channel extends through the body from the first surface to the second surface, wherein the channel is configured to carry the injected substance from the first surface to the second surface, and wherein the injected substance includes an adhesive that adheres the second surface to the portion of the structure;
  a seal member including a first flap with a first proximal end and a first distal end, the first proximal end attached to the second surface at a first attachment point, wherein the first flap comprises an outer surface that faces away from the second surface, and wherein the seal member further including a sealant bead arranged on the outer surface of the flap;
  a structure inserted in the recess, such that a portion of the structure is seated within the recess, and the second surface and the third surface surround the portion of the structure, wherein the seal member is arranged between the second surface and the portion of the structure such that the seal member provides a seal between the second surface and the portion of the structure.

6. The apparatus of claim 5, wherein the structure includes one or more tubes.

7. The apparatus of claim 5, wherein the seal member creates an enclosed, sealed space between the node and the portion of the structure, and wherein the second surface is configured to be adhered to the portion of the structure by an adhesive in the enclosed, sealed space.

8. The apparatus of claim 5, wherein the channel comprises a first channel portion and a second channel portion, the first channel portion extending into the body of the additively manufactured node from the first surface, the second channel portion extending into the body from the second surface, wherein the first channel portion meets the second channel portion in the body, and wherein the second channel portion is greater in size than the first channel portion in at least one dimension.

9. An apparatus comprising:
  an injected substance;
  an additively manufactured node including:
    a first surface;
    a second surface opposite the first surface;
    a third surface non-parallel to the second surface, wherein the second surface and the third surface bound a recess in the node;
    a body separating the first surface from the second surface; and
    a channel formed within the body separating the first surface from the second surface, wherein the channel extends through the body from the first surface to the second surface, and wherein the channel is configured to carry an injected substance from the first surface to the second surface; and
  a structure inserted in the recess, such that a portion of the structure is seated within the recess, and the second surface and the third surface surround the portion of the structure, wherein the structure is defined by a third proximal end and a third distal end, wherein the portion of the structure comprises the third distal end, and wherein the third distal end of the structure is seated against the third surface of the node;

a seal member including a first flap with a first proximal end and a first distal end, the first proximal end attached to the second surface at a first attachment point, wherein the seal member is arranged between the second surface and the portion of the structure such that the seal member provides a seal between the second surface and the portion of the structure.

10. The apparatus of claim 7, wherein the structure includes one or more tubes.

11. The apparatus of claim 7, wherein the seal member creates an enclosed, sealed space between the node and the portion of the structure, and wherein the second surface is configured to be adhered to the portion of the structure by an adhesive in the enclosed, sealed space.

12. The apparatus of claim 7, wherein the channel comprises a first channel portion and a second channel portion, the first channel portion extending into the body of the additively manufactured node from the first surface, the second channel portion extending into the body from the second surface, wherein the first channel portion meets the second channel portion in the body, and wherein the second channel portion is greater in size than the first channel portion in at least one dimension.

* * * * *